(12) United States Patent
Terada et al.

(10) Patent No.: US 6,901,170 B1
(45) Date of Patent: May 31, 2005

(54) IMAGE PROCESSING DEVICE AND RECORDING MEDIUM

(75) Inventors: Yoshihiro Terada, Ebina (JP); Alan Filipski, Phoenix, AZ (US); Marvin T. Ling, Phoenix, AZ (US)

(73) Assignee: Fuji Xerox Co., Ltd., Tokyo (JP)

( * ) Notice: Subject to any disclaimer, the term of this patent is extended or adjusted under 35 U.S.C. 154(b) by 924 days.

(21) Appl. No.: 09/655,310

(22) Filed: Sep. 5, 2000

(51) Int. Cl.[7] ............................................. G06K 9/40
(52) U.S. Cl. ...................................... 382/260; 382/262
(58) Field of Search ................................. 382/254, 260, 382/262, 264, 266, 269, 261

(56) References Cited

U.S. PATENT DOCUMENTS

| | | | | |
|---|---|---|---|---|
| 5,418,899 A | * | 5/1995 | Aoki et al. | ................. 345/668 |
| 6,055,340 A | * | 4/2000 | Nagao | ......................... 382/261 |
| 6,185,334 B1 | * | 2/2001 | Cheung et al. | ............. 382/199 |

FOREIGN PATENT DOCUMENTS

| | | |
|---|---|---|
| JP | A 8-22532 | 1/1996 |
| JP | A 10-243250 | 9/1998 |

* cited by examiner

Primary Examiner—Thomas D. Lee
(74) Attorney, Agent, or Firm—Oliff & Berridge, PLC

(57) ABSTRACT

An image processing apparatus and a recording medium which can improve the quality of a color document image. Smoothing conditions which are defined by three parameters of "filter size", "offset", and "overlap" are set. An edge image which was generated in an edge detection processing is referred to, and a determination is made as to whether an edge pixel exists in a noticed region. When the edge pixel does not exist in the noticed region, a smoothing processing is carried out. When the edge pixel exists in the noticed region, it is determined inappropriate to effect the smoothing processing, and the process goes to a subsequent processing without effecting the smoothing processing. The processing is carried out until the image scanning ends. When the image scanning ends, the next smoothing conditions are set and the processing which is the same as the one described above is performed.

16 Claims, 24 Drawing Sheets

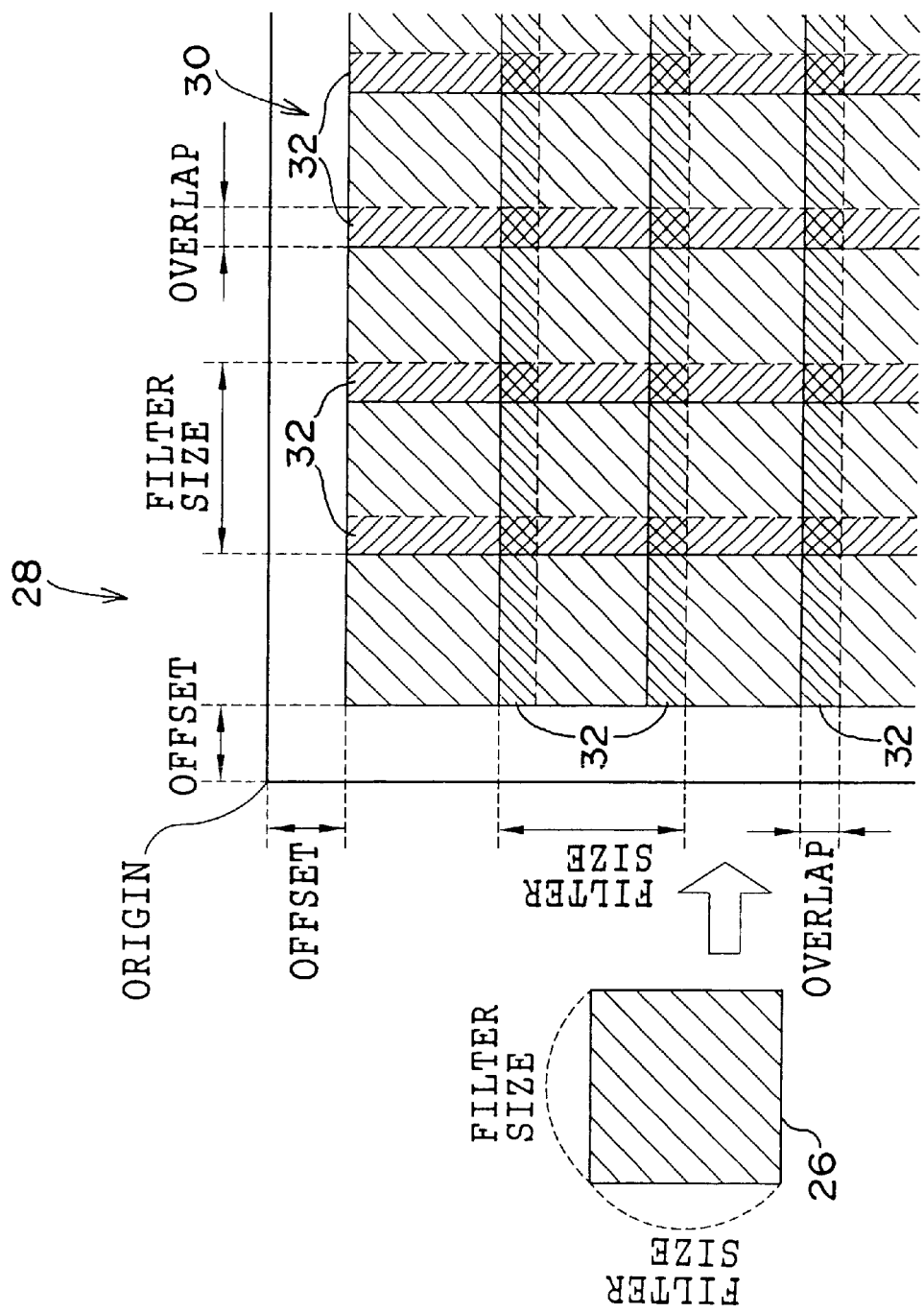

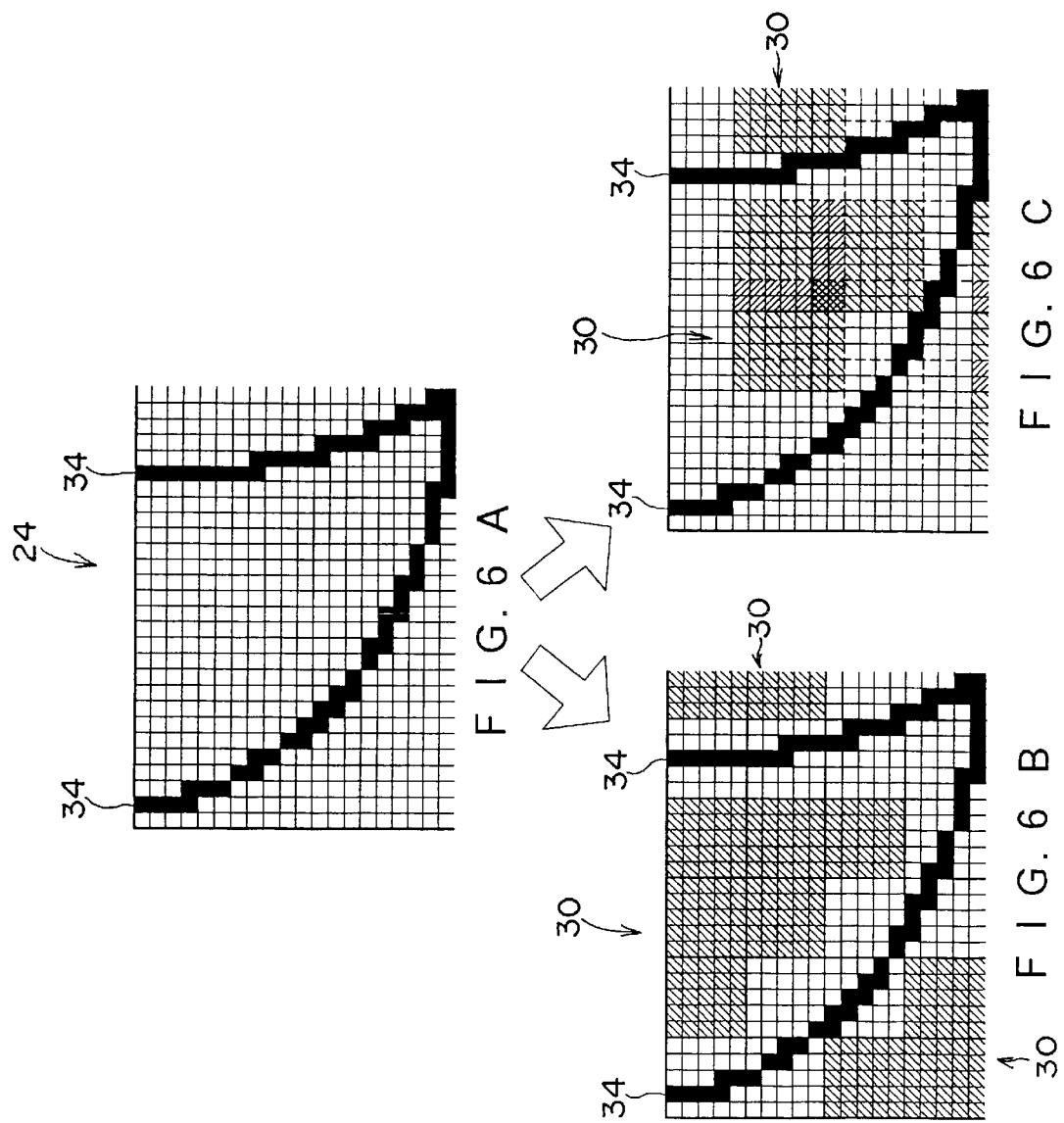

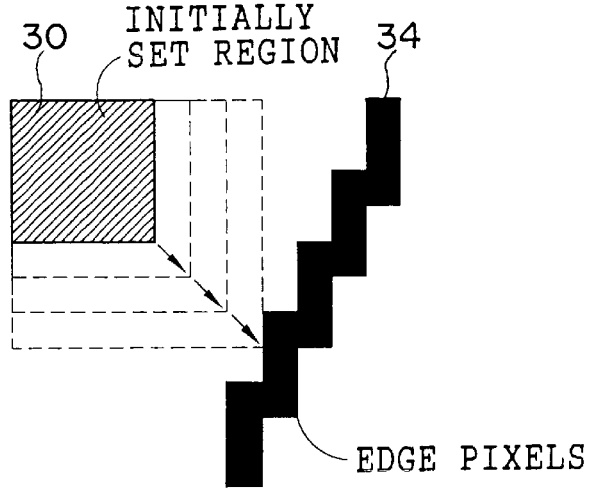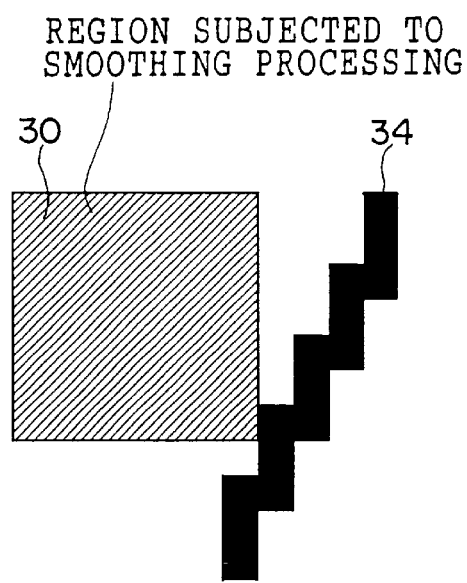
F I G. 7 A
F I G. 7 B

F I G. 9
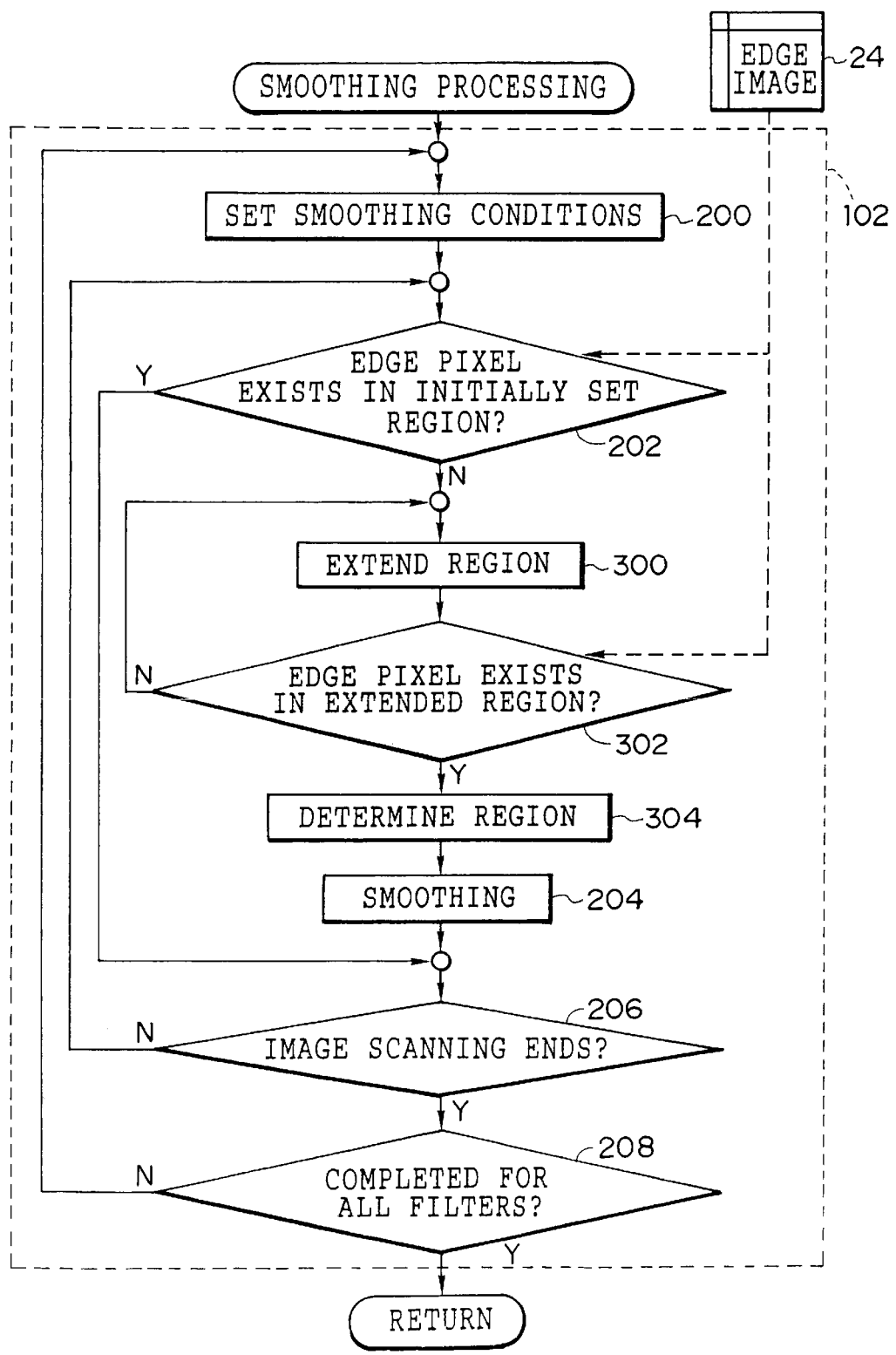

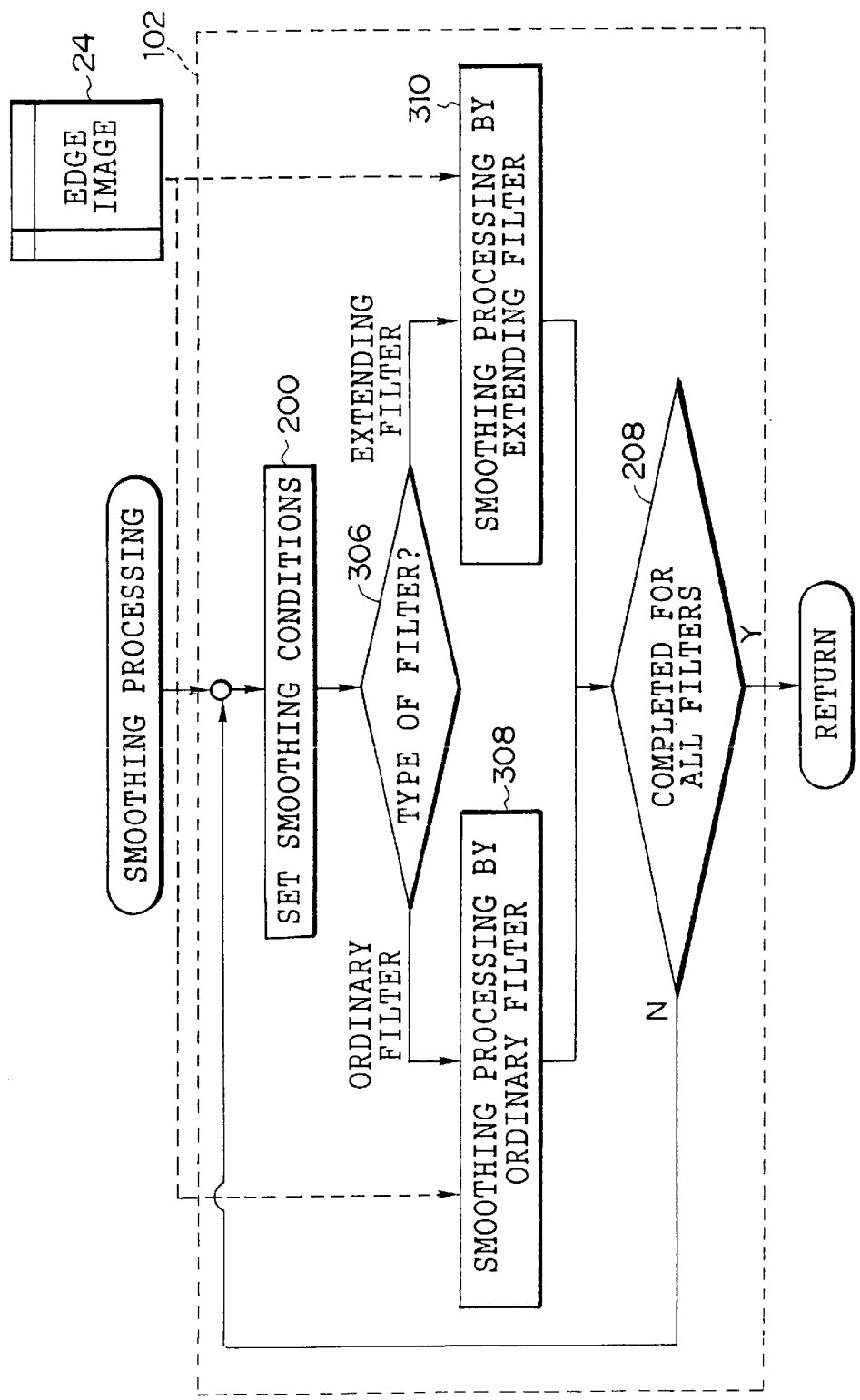
F I G. 11

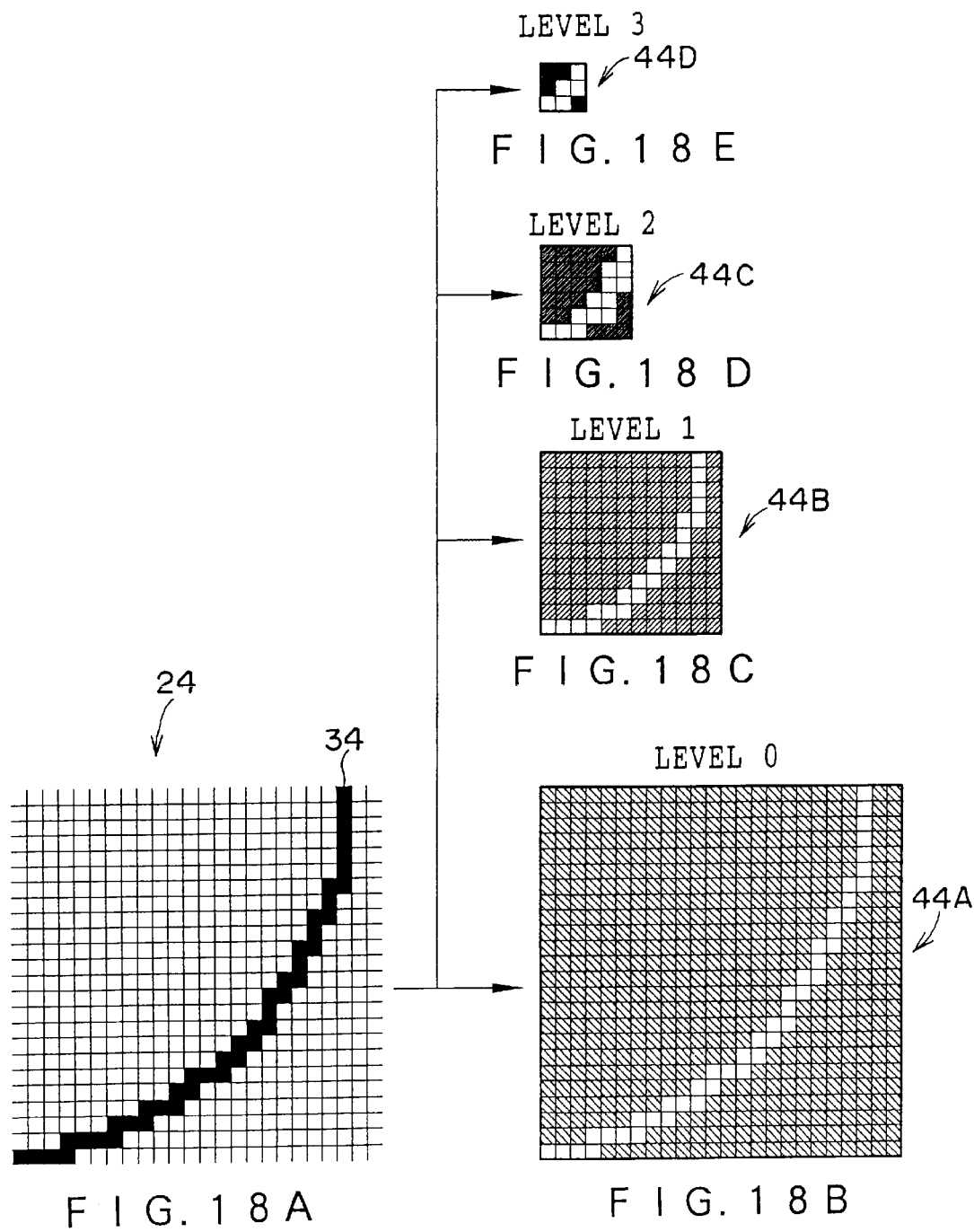

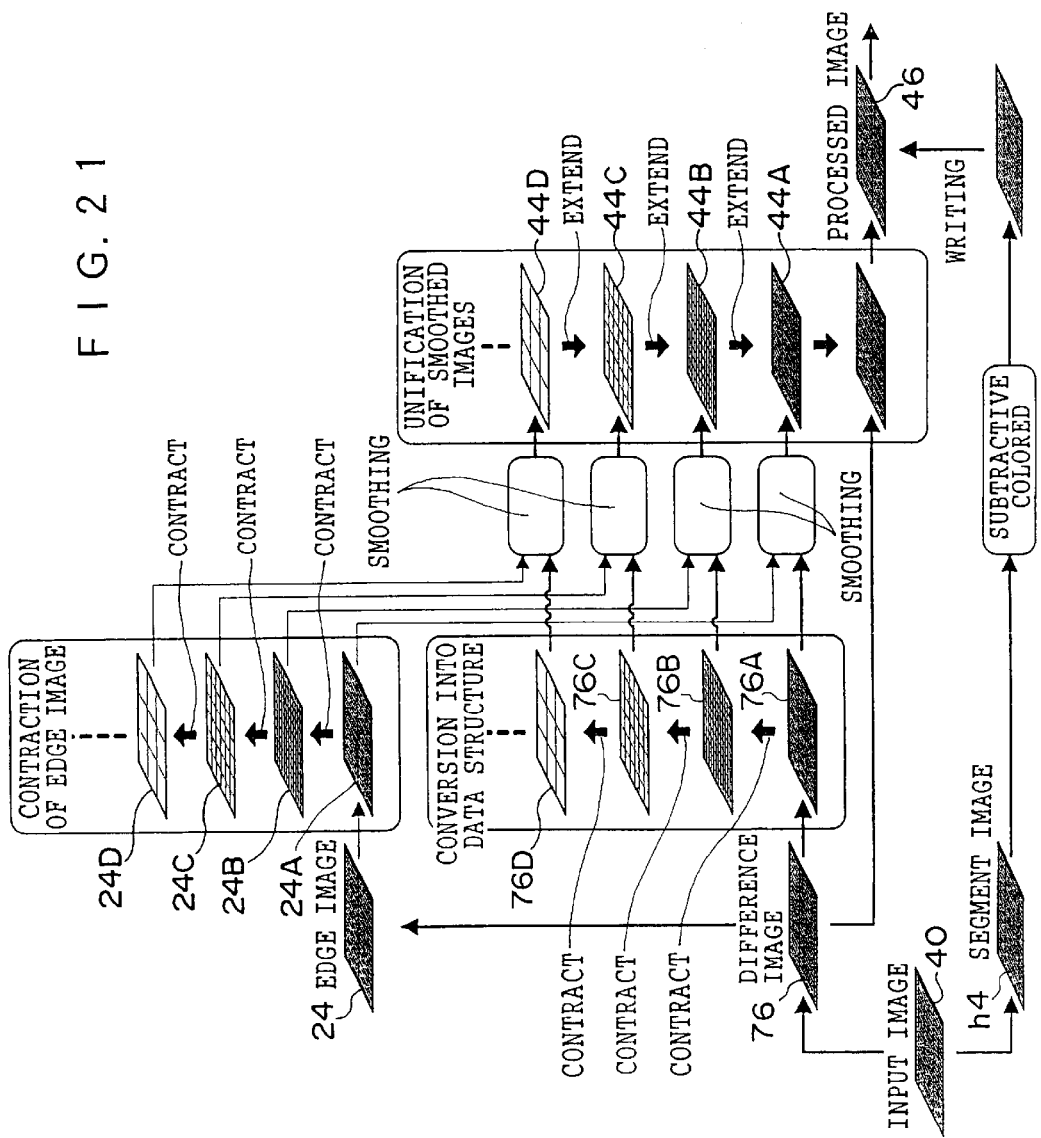

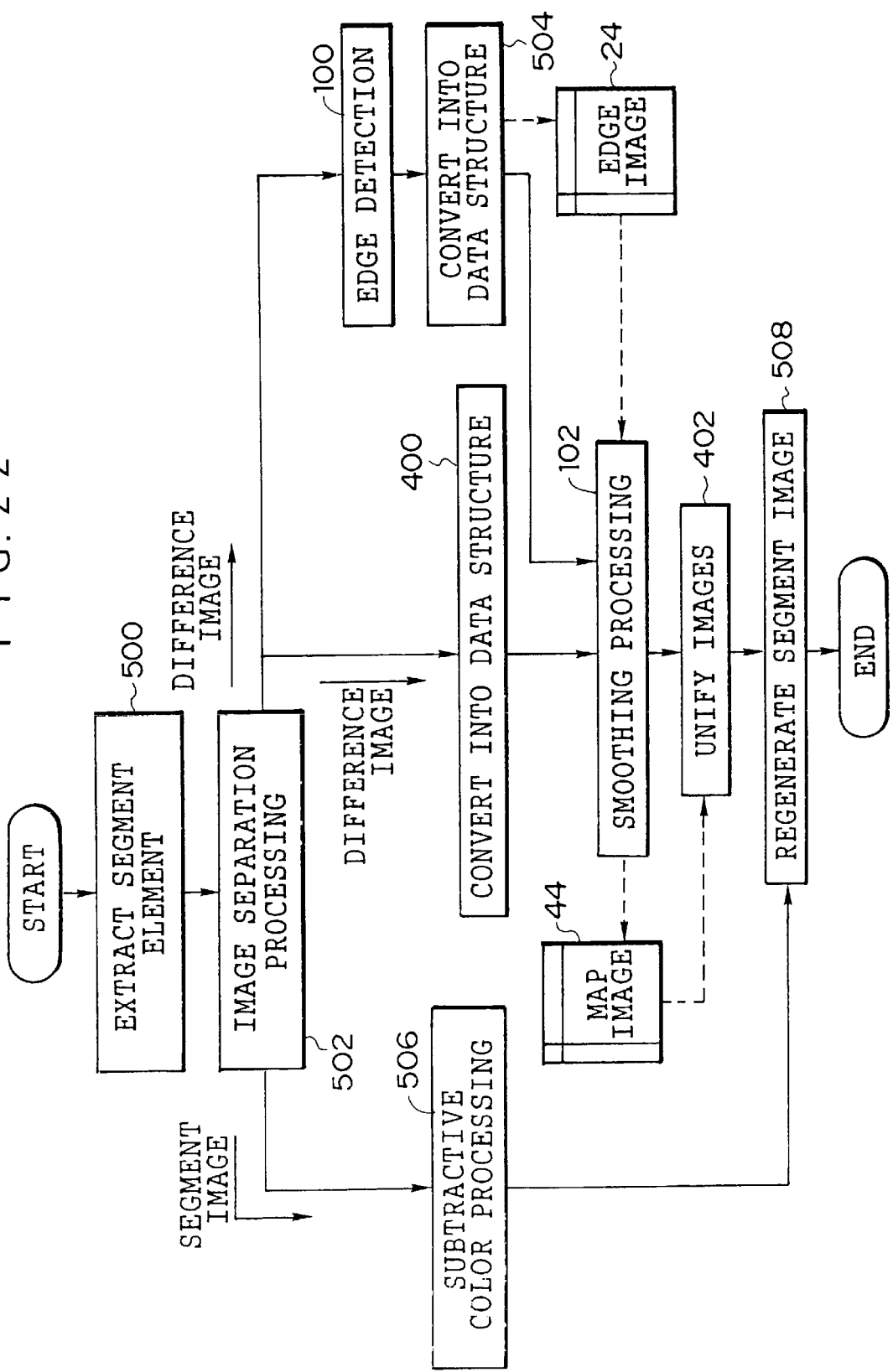

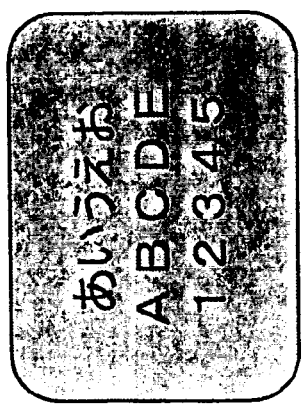
FIG. 23A
INPUT IMAGE 40
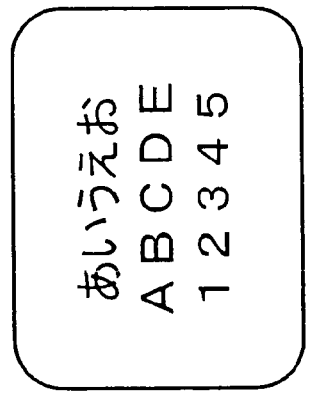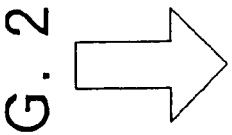
FIG. 23B
SEGMENT IMAGE 74
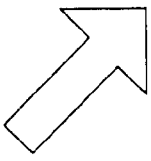
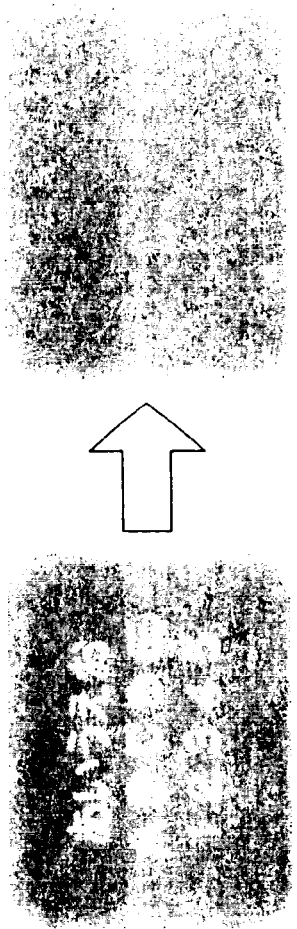
FIG. 23C
FIG. 23D
DIFFERENCE IMAGE 76

IMAGE PROCESSING DEVICE AND RECORDING MEDIUM

BACKGROUND OF THE INVENTION

1. Field of the Invention

The present invention relates to an image processing device and a recording medium, and in particular, to an image processing device and a recording medium which enable processing for improving image quality in a digital color image processing, such as reading or copying of a color document, or the like.

2. Description of the Related Art

In recent years, digital color devices have been remarkably developed and spread in the fields of scanners, copying machines, printers, and the like. Further, a document composing environment such as personal computers, word processor softwares, or the like has also advanced and developed. Accordingly, in the field of color image reproduction which uses the above-described digital color devices, not only a natural image of a person, landscape, or the like, but also a document image which is mainly formed by character information, a graph, a diagram, or the like has become an important object of processing.

When the document image is compared to the natural image, characteristically, the document image is expressed by extremely small number of colors, such as from two or three colors to about dozens of colors at most, and a great number of regions having a large surface area and the same color exist in the document image, or the like. As a result, caused by the quality of an original document, by the device characteristics of an image reading device, and by excessive emphasis or the like in an image processing such as gradation correction, MTF correction, or the like, there is a problem in that noise or uneven color is generated in the color region which should be originally the same at the time of image reproduction.

In order to solve the problem, various methods of enhancing the uniformity of a color by using a so-called subtractive color processing technique which reduces the number of colors in an original image have been proposed. For example, Japanese Patent Application Laid-Open (JP-A) No. 8-22532 discloses a technique of reducing unevenness in a document image by limiting a component ratio of colors exist in an original image. Further, JP-A-10-243250 discloses a technique of improving the reproduction of uniform color regions by means of setting a color region which should be reproduced flat and a color region which is not in accordance with a color distribution in an original image and then effecting color correction.

SUMMARY OF THE INVENTION

However, the above-described conventional art is either a processing for replacing a color with the closest color in the unit of each pixel or a processing of changing a correction coefficient therein. Thus, the processings are likely to be affected by a dot component or minute noise existing in the original image. As a result, there is a case in which reduction in the number of colors does not necessarily lead to uniform color enhancement in the desired region. Further, setting of a representative color which is effected in advance of the color replacement also requires complicated arithmetic processing and, on the whole, there is a drawback in that appropriate processing quality cannot be obtained with respect to the processing scale.

The present invention was developed in light of the aforementioned, and the object thereof is to provide an image processing apparatus and a recording medium which can improve the quality of a color document image.

In order to achieve the above-described object, a first aspect of the present invention is an image processing apparatus, comprising: edge detection means which detects an edge from an input image, the input image having been read by an image reading means which scan-reads an image; and smoothing means which carries out a plurality of smoothing processings, and in the smoothing processing, the smoothing means selects one smoothing condition from a plurality of smoothing conditions, which have been determined in advance and which include a region to be processed which is smaller than the input image, an amount of movement of the region to be processed, and a range of scanning in the input image, and on the basis of the selected smoothing condition, the smoothing means smoothes an interior of the region to be processed in the input image, in which the edge is not detected, while moving and scanning the region to be processed within the range of scanning by the amount of movement.

In accordance with the present invention, the input image has been read at a resolution which was determined beforehand by the image reading means, e.g., a scanner or the like, which scan-reads an image, and an image generating means detects the edge from the input image. The edge includes, for example, a certain region which can be recognized as a character, a line, or the like and which has a color different from the peripheral colors.

It should be noted that, for example, when an image, such as a document image or the like, which has a great number of regions having a comparatively large surface area and the same color, is scan-read, uneven color may be generated in the same color regions, and the image quality may deteriorate. As a result, it is desirable to simulate the read image to the original image by making the color of the same color regions substantially uniform.

Accordingly, the smoothing means, first, selects the one smoothing condition from the plurality of smoothing conditions which have been determined in advance. The smoothing conditions include the region to be processed which is smaller than the input image, i.e., the size of the region which is smoothed, the amount of movement of the region per one time, and the range of scanning in the input image, i.e., the range to be smoothed which is subjected to the smoothing processing.

Then, on the basis of the selected smoothing conditions, the smoothing means smoothes the interior of the region to be processed in the input image, in which the edge is not detected, while moving and scanning the region to be processed by the amount of movement within the range of scanning. Namely, a determination is made as to whether the edge detected by the edge detection means exists in the region to be processed. If the edge exists, it is determined inappropriate to effect the smoothing. The region to be processed is moved by the set amount of movement and the same processing is carried out. On the other hand, if the edge does not exist, the interior of the region to be processed is smoothed.

The smoothing processing is effected under the plurality of conditions. Namely, when the smoothing is completed for all of the ranges of scanning under the selected smoothing condition, the other smoothing condition is set from the plurality of smoothing conditions, and the processing which is the same as the one described above is effected. Namely, the smoothing processing is performed under the smoothing condition in which at least one of the size of the region to be processed, the amount of movement, and the range of scanning is different from the previous one.

The smoothing processing may be directly carried out to the input image. In this case, when the smoothing processing ends, an ultimate processed image is obtained. Alternatively, the ultimate processed image is obtained by generating the smoothed image and by synthesizing the generated smoothed image and the input image.

In this way, only the region which does not include the edge pixel is subjected to the smoothing processing under the plurality of different smoothing conditions. Accordingly, a region which has substantially the uniform color or a gradation region which has gentle changes in gradation can be reproduced desirably.

The plurality of smoothing conditions which have been determined in advance may be stored in a storing means. In this way, it is easy to change the smoothing conditions or the like.

Moreover, it is possible that the smoothing means obtains a mean value of pixel values in the region to be processed and smoothes the interior of the region to be processed by replacing the pixel values in the region to be processed with the obtained mean value. It is possible that the smoothing means obtains a central value of the pixel values in the region to be processed and smoothes the interior of the region to be processed by replacing the pixel values in the region to be processed with the obtained central value.

Further, the smoothing means may determine as to whether the detected edge exists in the region to be processed, and if the edge exists, the smoothing means may extend the region to be processed. At this time, the smoothing means extends the region to be processed until it is determined that the edge exists in the region to be processed, and if the edge exists in the extended region to be processed, it is preferable that the smoothing means resets the last region to be processed as a region to be processed. In this way, the smoothing processing can be carried out more efficiently.

Moreover, image generating means which generates a plurality of converted images having resolutions which are lower than the resolution of the input image may be further included. It is possible that the smoothing means further generates a plurality of smoothed images by effecting the plurality of smoothing processings to the plurality of converted images, that the smoothing means respectively converts the plurality of generated smoothed images into converted smoothed images whose resolutions are the same as the resolution of the input image, and that the smoothing means synthesizes the input image and the converted smoothed images which have been respectively converted.

In order to convert the input image into the converted image having a resolution lower than the resolution of the input image, for example, the input image is divided into regions including a plurality of pixels, the mean value of pixels in the region is calculated, and the calculated mean value of pixels is the pixel value of the region. The converted image having a low resolution may be generated one or plural.

Then, for example, the respective converted images having a plurality of types of resolutions are subjected to the smoothing processing independently under the different types of smoothing conditions. Namely, the size of the region to be processed is reduced with respect to the image having a high resolution, and the size of the region to be processed is increased with respect to the image having a low resolution. The input image and the converted smoothed images which were subjected to the smoothing processing are synthesized, such that the smoothing processing can be effected efficiently.

Further, a segment element extracting means, which extracts a segment element from the input image, and a difference image generating means, which generates a difference image which has excluded the segment element from the input image, may be further included. The smoothing means may carry out the plurality of smoothing processings to the difference image.

Namely, when the segment element such as a character, a table, a ruled line, or the like exists in the image, the plurality of smoothing processings are carried out to the difference image which has excluded the segment element. In this way, the smoothing processing can be carried out accurately even to the image which includes the segment element such as a character or the like, and the image quality can improve.

Moreover, the pixel value of a pixel included in the segment element may be compared to the pixel value of a specific color which has been determined in advance. If the difference between the pixel value of the pixel included in the segment element and the pixel value of the specific color which has been determined in advance falls within a predetermined range, the pixel value of the pixel included in the segment element may be replaced with the pixel value of the specific color.

Namely, for example, the color distribution of the segment element in a three-dimensional color space is measured. On the basis of the measured color distribution, a distance in the three-dimensional color space between the pixel value of the pixel included in the segment element and the pixel value of the specific color is obtained. If the obtained distance is smaller than a predetermined threshold value, it is determined that the pixel is a color similar to the specific color and that the pixel is replaced with the pixel value of the specific color. In this way, dispersion of color in the segment element can be reduced. Further, since the specific color is black, the image quality of a document image which has a great number of black colors, such as a character or the like, can improve.

A computer readable recording medium on which a program for executing processings is recorded, the program comprising the steps of: detecting an edge from an input image which has been read by an image reading means which scan-reads an image; and carrying out a plurality of smoothing processings, and in the smoothing processing, a smoothing condition is selected from a plurality of smoothing conditions, which have been determined in advance and which include a region to be processed which is smaller than the input image, an amount of movement of the region to be processed, and a range of scanning in the input image, and on the basis of the selected smoothing condition, smoothing an interior of the region to be processed in the input image, in which the edge is not detected, while moving and scanning the region to be processed within the range of scanning by the amount of movement. Accordingly, the above-described processings can be performed on the computer.

A second aspect of the present invention is a computer readable recording medium on which a program for executing processings is recorded, the program comprising the steps of: detecting an edge from an input image which has been read by image reading means which scan-reads an image; and carrying out a plurality of smoothing processings, and in the smoothing processing, a smoothing condition is selected from a plurality of smoothing conditions, which have been determined in advance and which include a region to be processed which is smaller than the input image, an amount of movement of the region to be processed, and a range of scanning in the input image, and on the basis of the selected smoothing condition, smoothing an interior of the region to be processed in the input image, in which the edge is not detected, while moving and scanning the region to be processed within the range of scanning by the amount of movement.

Further, the other respective processings described above can be also performed on the computer by the computer readable recording medium, onto which the program for executing the processings is recorded.

BRIEF DESCRIPTION OF THE DRAWINGS

FIGS. 4A and 4B are views for explaining about a smoothing filter.

FIGS. 6A through 6C are views for explaining about smoothed regions.

FIGS. 7A and 7B are views for explaining about an extending filter.

FIG. 9 is a flowchart which shows the flow of a smoothing processing.

FIG. 11 is a flowchart which shows the flow of a smoothing processing.

FIGS. 18A through 18E are views for explaining about image unification.

FIG. 21 is a view for explaining about the concept of a smoothing processing.

FIG. 22 is a flowchart which shows the flow of an image processing.

FIGS. 23A through 23D are views for explaining about a difference image.

DESCRIPTION OF THE PREFERRED EMBODIMENTS

First Embodiment

Figure 1:
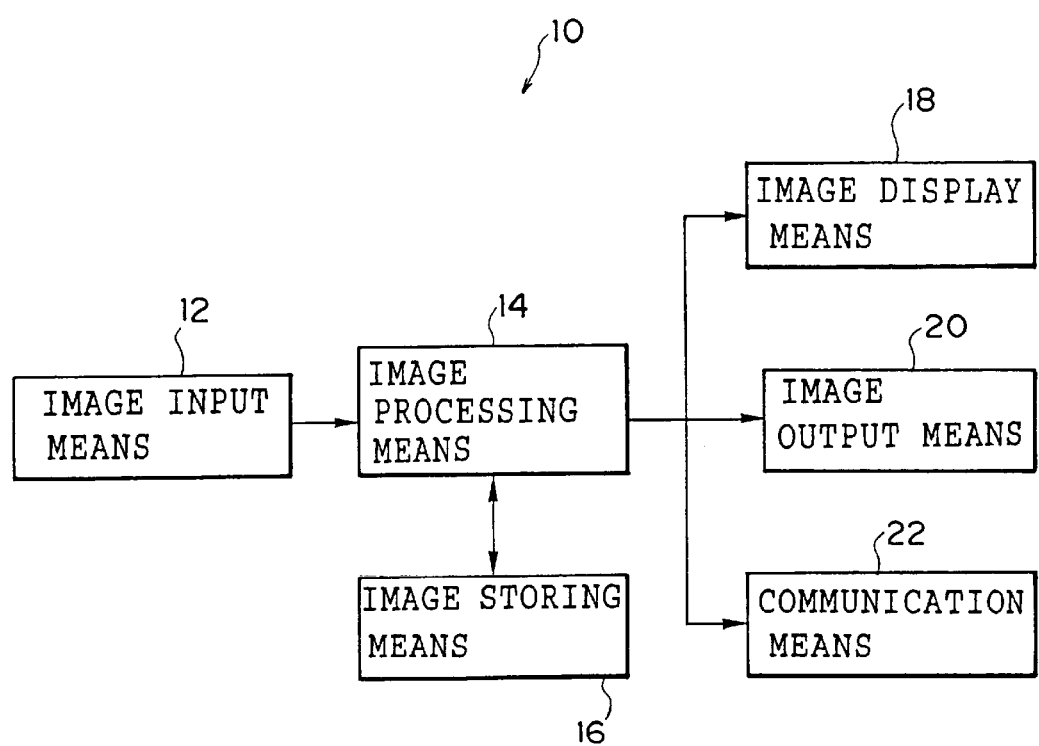
FIG. 1 is a schematic structural view of an image processing apparatus relating to the present invention.

A first embodiment of the present invention will be described hereinafter with reference to the drawings. FIG. 1 shows a schematic block diagram of an image processing apparatus 10 relating to the present invention.

As illustrated in FIG. 1, the image processing apparatus 10 includes an image input means 12, an image processing means 14, an image storing means 16, an image display means 18, an image output means 20, and a communication means 22.

The image input means 12 is a means for inputting an image and is a color image input device, for example, such as a flat-bed scanner or the like. The image processing means 14 is a means for performing an image processing for improving the quality of an image which has been input from the image input means 12. The image storing means 16 accumulates/stores a color original image which has been input from the image input means 12, a color image which has been subjected to correction processing by the image processing means 14, or the like. The image display means 18 is a means for displaying the color image which has been subjected to correction processing by the image processing means 14. The image output means 20 is a means for printing the color image which has been subjected to the correction processing by the image processing means 14. The communication means 22 is a means for sending the color image which has been subjected to the correction processing by the image processing means 14, for example, to the other device.

The image input means 12 corresponds to an image reading means of the present invention. The image processing means 14 corresponds to an edge detection means, a smoothing means, an image generating means, a segment element extracting means, and a difference image generating means of the present invention. The image storing means 16 corresponds to a storing means of the present invention.

In the image processing apparatus 10, a document image, which is to be the object of processing and has been recorded, for example, onto a paper, is read by the image input means 12. The input means 12 outputs the read image to the image processing means 14 as a full color image having, for example, eight bits of R, G, and B per one pixel.

The color image, which has been subjected to the correction processing by the image processing means 14, is accumulated/stored in the image storing means 16, or is displayed by the image display means 18, or is print-output from the image output means 20, or is sent to the other digital color processing device via the communication means 22.

Next, the details of image processing which can be performed by the image processing means 14 will be described.

Figure 2:
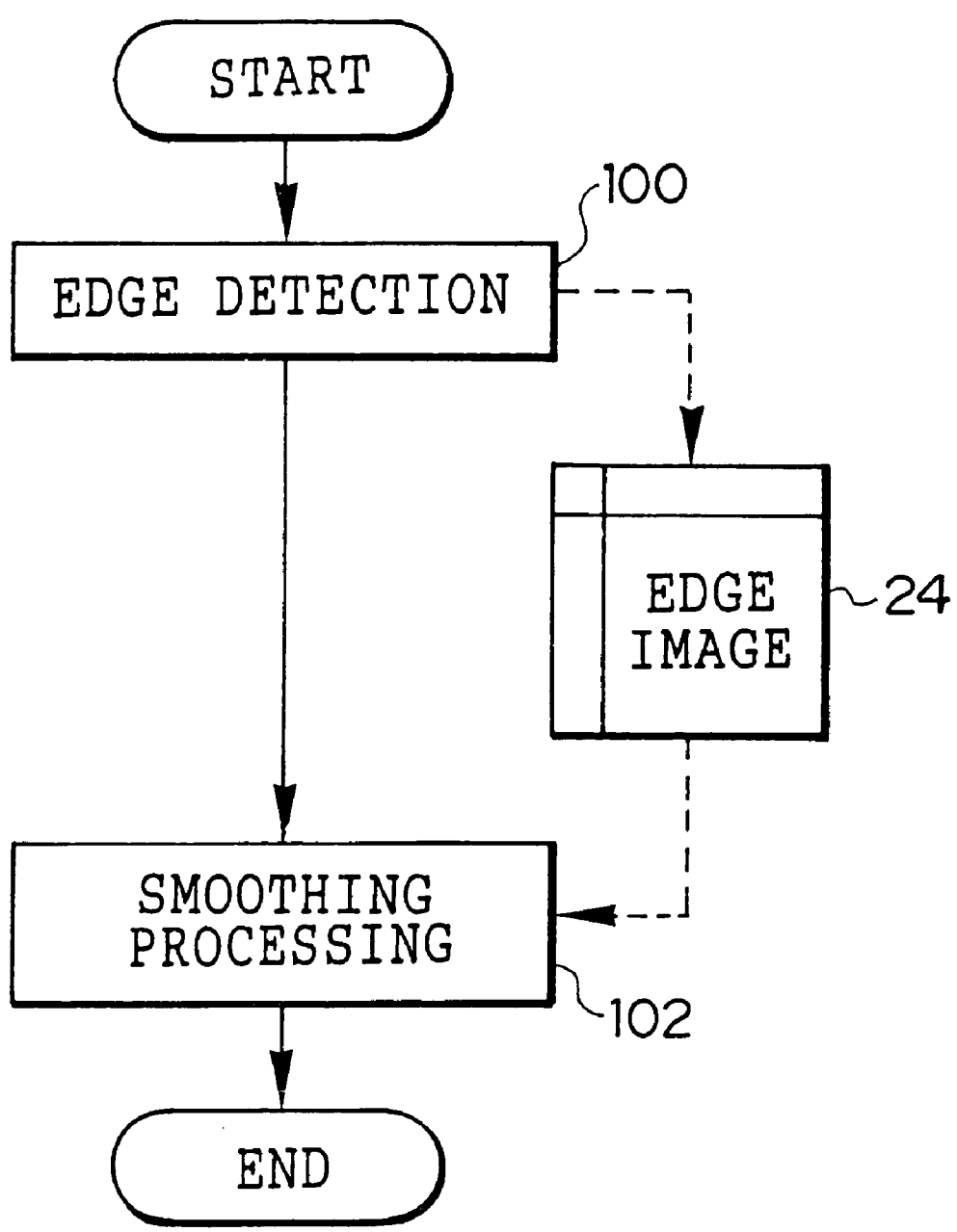
FIG. 2 is a flowchart which shows the flow of an image processing.

FIG. 2 shows a flowchart which illustrates the schematic flow of the image processing in the present embodiment. As shown in FIG. 2, first, a digital color image which has been input from the image input means 12 is subjected to an edge detection processing (step 100). The input respective images of R (red), G (green), and B (blue) are subjected to a known edge detection processing, such as Sobel operation or the like. Thereafter, the logical sum of the obtained binary image is found and a binary image which indicates edge information is generated. The binary image is stored in the image storing means 16 as an edge image 24.

Next, referring to the generated edge image 24, a smoothing processing is carried out to the respective images of R, G, and B (step 102).

The edge detection processing corresponds to the edge detection means of the present invention and the smoothing processing corresponds to the smoothing means of the present invention.

Figure 3:
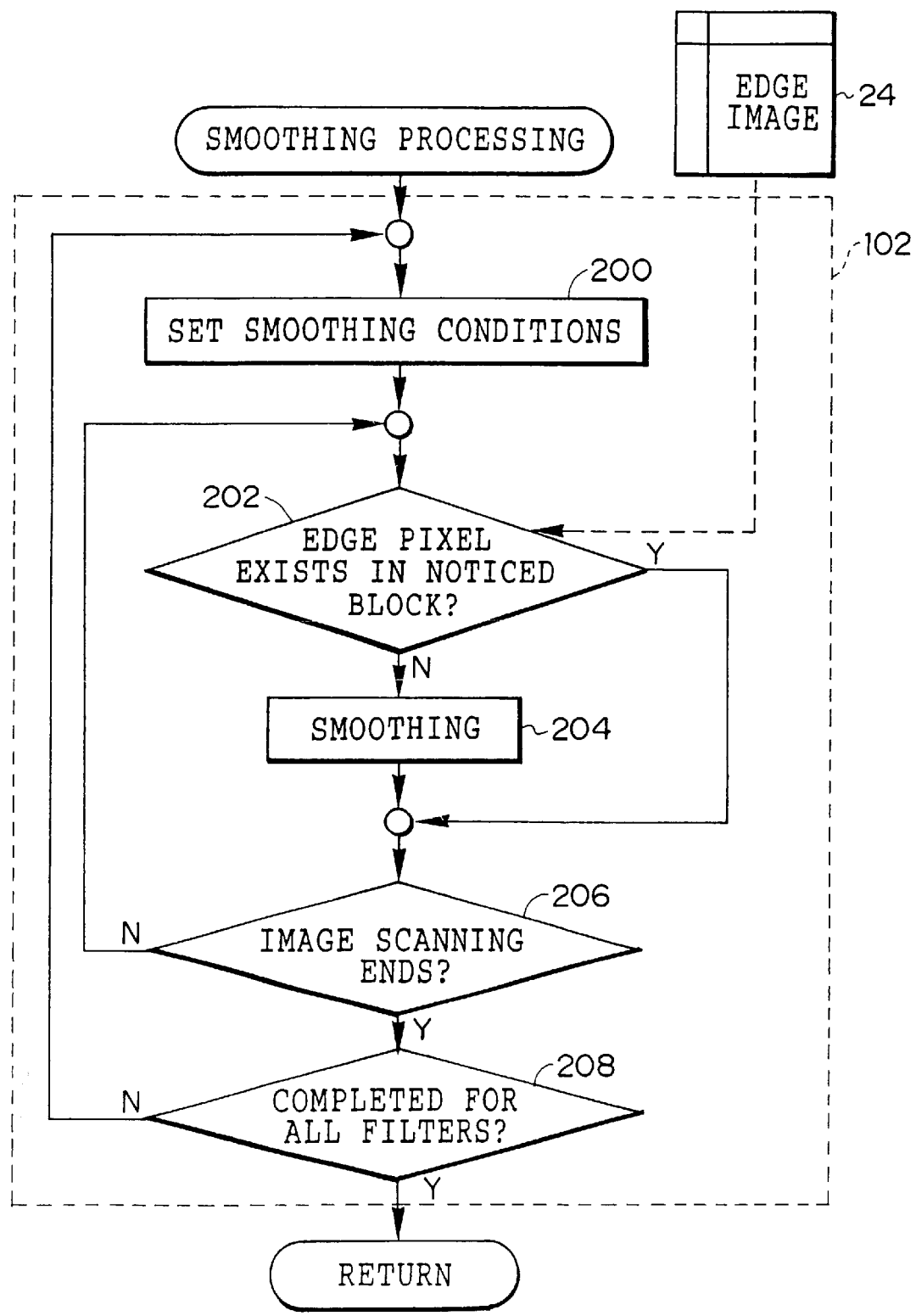
FIG. 3 is a flowchart which shows the flow of a smoothing processing.

The smoothing processing will be explained with reference to a flowchart shown in FIG. 3. As illustrated in FIG. 3, first, setting of smoothing conditions is effected (step 200). Namely, the smoothing processing in the present embodiment is carried out by repeatedly applying a plurality of smoothing filters to the input image, and parameters of the smoothing filter are set.

As illustrated in FIGS. 4A and 4B, the smoothing filter is defined by three parameters, i.e., "filter size", "offset", and "overlap".

As shown in FIGS. 4A and 4B, the filter size is a parameter for determining the size, i.e., the longitudinal and lateral size (number of pixels) of a noticed pixel 26, which serves as a region to be processed. The longitudinal size and the lateral size may be the same, i.e., a square filter may be formed. Alternatively, the longitudinal size and the lateral size may be different, i.e., a rectangular filter may be formed.

As illustrated in FIG. 4B, the offset is a parameter for determining a distance from a starting point of the smoothing processing, i.e., the end portion of an input image 28, to the end portion of a smoothed region 30, to which the smoothing filter is applied. The offset can be expressed by the number of pixels which indicates a distance from an origin, e.g., the end portion of a document (the upper left portion in FIG. 4B). The longitudinal offset and the lateral offset may be the same, or the longitudinal offset and the lateral offset may be different.

As shown in FIG. 4B, the overlap is a parameter for determining the width of an overlapped region 32 which overlaps the processings by the smoothing filter. The overlap may be set so that the longitudinal width and the lateral width are the same. Alternatively, the overlap may be set so that the longitudinal width and the lateral width are different.

The smoothing processing is realized by replacing the pixel value in the noticed region 26, which is defined by the above-described three parameters, with a representative value. Namely, setting of the smoothing conditions is to set the three parameters and to set the smoothing filter.

At image scanning in the smoothing processing, the noticed region 26 is not moved per unit of one pixel. The movement of the noticed region 26 is carried out by a pixel width which is determined by the amount of movement (=filter size−overlap).

Figure 5B:
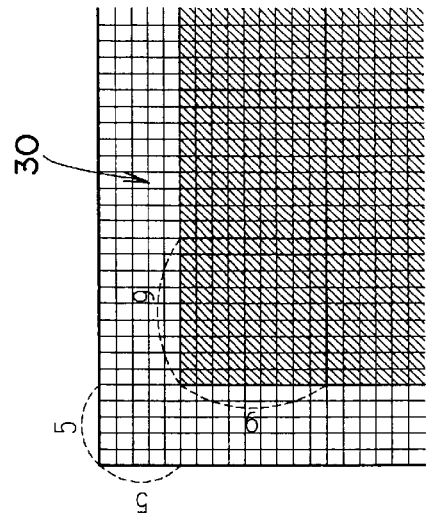
FIGS. 5A through 5D are views for explaining about smoothing filters.
Figure 5D:
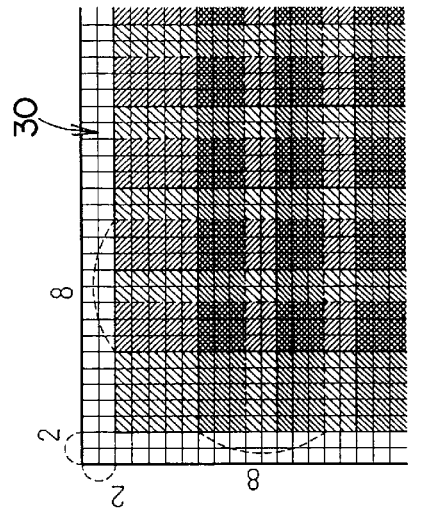
Figure 5A:
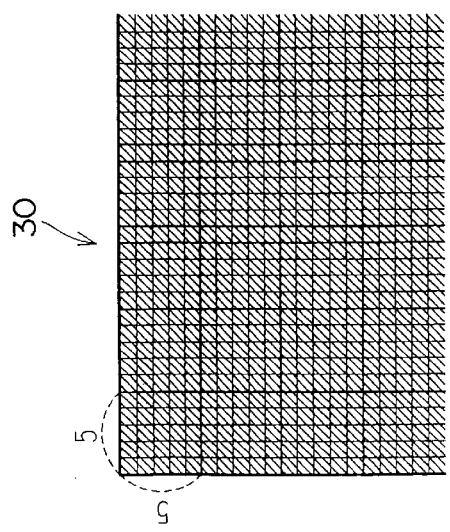
Figure 5C:
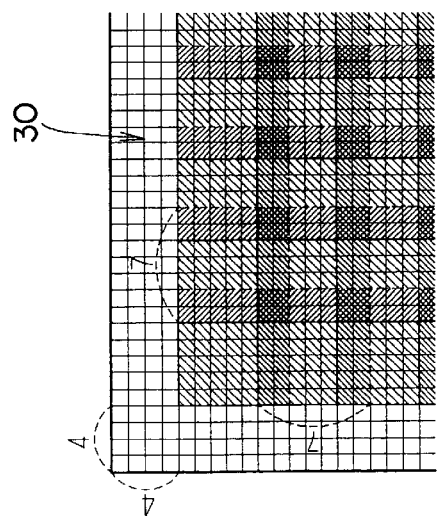

FIGS. 5A through 5D show examples of smoothed regions 30 which are processed by smoothing filters. FIG. 5A shows a smoothed region 30 which is processed by a smoothing filter defined by parameters of filter size=5, offset=0, and overlap=0. FIG. 5B shows a smoothed region 30 which is processed by a smoothing filter defined by parameters of filter size=9, offset=5, and overlap=0. FIG. 5C shows a smoothed region 30 which is processed by a smoothing filter defined by parameters of filter size=7, offset=4, and overlap=2. FIG. 5D shows a smoothed region 30 which is processed by a smoothing filter defined by parameters of filter size=8, offset=2, and overlap=3.

In this way, characteristics of the smoothing filters to be applied can be changed by changing the respective parameters. Thus, generation of a block-shaped noise or a similar contour which is caused by the smoothing processing can be prevented.

In the image storing means 16, the parameters of a plurality of types of smoothing filters are stored, for example, as data on the smoothing filters shown in the following Table 1.

TABLE 1

| No. | Filter Size | Offset | Overlap |
|---|---|---|---|
| 1 | 52 | 10 | 8 |
| 2 | 32 | 8 | 10 |
| 3 | 20 | 12 | 0 |
| 4 | 17 | 0 | 0 |
| 5 | 8 | 2 | 5 |
| 6 | 5 | 3 | 0 |
| 7 | 2 | 1 | 1 |
| 8 | 2 | 0 | 0 |

In the above setting of the smoothing conditions (step 200), the parameters of the smoothing filter which were stored in the image storing means are read out and set. For example, when the parameters of the smoothing filter described in the above-described Table 1 are used, first, a smoothing filter which is defined by the parameters of filter No. 1, i.e., filter size=52, offset=10, and overlap=8, is set.

Next, an edge image 24 which was generated in the edge detection processing is referred to, and a determination is made as to whether an edge pixel exists in the noticed region 26 (step 202). If the edge pixel does not exist in the noticed region 26, the smoothing processing is carried out (step 204).

The smoothing processing is realized by replacing all of the pixels in the noticed region 26 with the representative color. For example, a mean value of the noticed pixel 26 is obtained as a representative color value, and all of the pixels are replaced with the representative color value.

On the other hand, if the edge pixel exists in the noticed region 26, it is determined inappropriate to perform the smoothing processing. The smoothing processing is not effected and the process goes to a subsequent processing.

Next, a determination is made as to whether the image scanning ends, i.e., the smoothing processing is completed for all of the smoothed regions 30 (step 206). If the image scanning does not end, the processings in the above steps 202 to 206 are repeated.

On the other hand, if the smoothing processing is completed for all of the smoothed regions 30, a determination is made as to whether the above processings are completed for all of the smoothing filters (step 208). If the processings are completed, the present processing ends.

On the other hand, if the above processings are not completed for all of the smoothing filters, the process returns to step 200. A smoothing filter which is defined by the next smoothing parameters, i.e., the parameters of filter No. 2 in the above Table 1, i.e., filter size=32, offset=8, overlap=10, is set, and the processing which is the same as the one described above is carried out. The smoothing processing is successively effected hereinafter in the same manner. At the end, the smoothing processing by a smoothing filter which is defined by the parameters of filter No. 8 is performed, and the present processing ends.

In the smoothing processing at the second time or thereafter, there is often a case in which uniformity of color of the noticed region 26 has been already enhanced by the smoothing processings which were effected hereinbefore. From the viewpoint of processing speed, it is not preferable that the mean value of the uniform region is further calculated and that the region is subjected to the pixel value replacement processing. Accordingly, though it also depends on the setting of the smoothing filters, it is preferable that the smoothing processing is effected from the larger filter size, for example, as illustrated in the above Table 1. Further, before the smoothing processings by the respective smoothing filters or at the time of calculation of the mean value, a determination is made as to whether the color of the noticed region 26 is substantially uniform. If the color is substantially uniform, it is preferable that the noticed region 26 is not subjected to the smoothing processing. By effecting these processings, the present processing can be simplified and the speed thereof increases.

FIGS. 6A through 6C show examples of smoothed regions 30 which are subjected to the smoothing processing by the above processings. FIG. 6A shows an edge image 24 which is generated at the edge detection. As illustrated in FIG. 6A, the edge image 24 is an image which includes edge pixels 34. The edge image 24 is referred to, and the smoothing processing is carried out only to a region of the edge image 24, in which the edge pixels 34 do not exist, by, for example, the smoothing filter which is defined by the parameters of filter size=5, offset=0, overlap=0, as shown in FIG. 5A. Accordingly, as illustrated in FIG. 6B, only the region excluding the edge pixels 34 becomes a smoothed region 30 (region denoted by hatches in the drawings).

Moreover, similarly, the smoothing processing is carried out only to the region of the edge image 24, in which the edge pixels do not exist, by the smoothing filter which is defined by, for example, the parameters of filter size=7, offset=4, overlap=2, as shown in FIG. 5C. Accordingly, as illustrated in FIG. 6C, only the region excluding the edge pixels 34 becomes a smoothed region 30 (region denoted by hatches in the drawings). Further, a region which is denoted by meshes in FIG. 6C is a region which is overlappingly subjected to the smoothing processing.

As described above, since only the region which does not include the edge pixels is subjected to the smoothing processing by the plurality of smoothing filters having different conditions (parameters), a good smoothing effect can be obtained.

In the present embodiment, an example is described of a case in which the mean value of the noticed region is used as the representative value which replaces the pixel values in the noticed region. However, the present invention is not limited to the same. For example, a central value of the region, i.e., an intermediate value between the smallest pixel value and the largest pixel value in the region, may be set as the representative value. In this way, the operation can be simplified. Further, a weight coefficient to a pixel in the region may be added to the parameters of the smoothing filter, and the representative value may be determined in accordance with a convolution operation.

Second Embodiment

Next, a second embodiment of the present invention will be explained. In the second embodiment, description will be given of a case in which the size of the smoothing filter, which is described in the above first embodiment and is defined by "filter size", "offset", and "overlap", is extended until an edge is detected.

Namely, in the present embodiment, as shown in FIG. 7A, a smoothed region 30 by a smoothing filter, which was set in initial setting, is extended referring to an edge image 24 until the smoothed region 30 abuts edge pixels 34 (hereinafter, the smoothing filter is referred to as "extending filter".). When the smoothed region 30 abuts the edge pixels 34, the smoothed region 30 as illustrated in FIG. 7B is determined.

In case of the extending filter as well, three parameters of "filter size", "offset", and "overlap" are set as initial parameters. However, the extending filter is different from the smoothing filter described in the previous first embodiment. Because the filter size varies in accordance with the positions of the edge pixels 34, importance of the parameters of offset and overlap is low.

Figure 8:
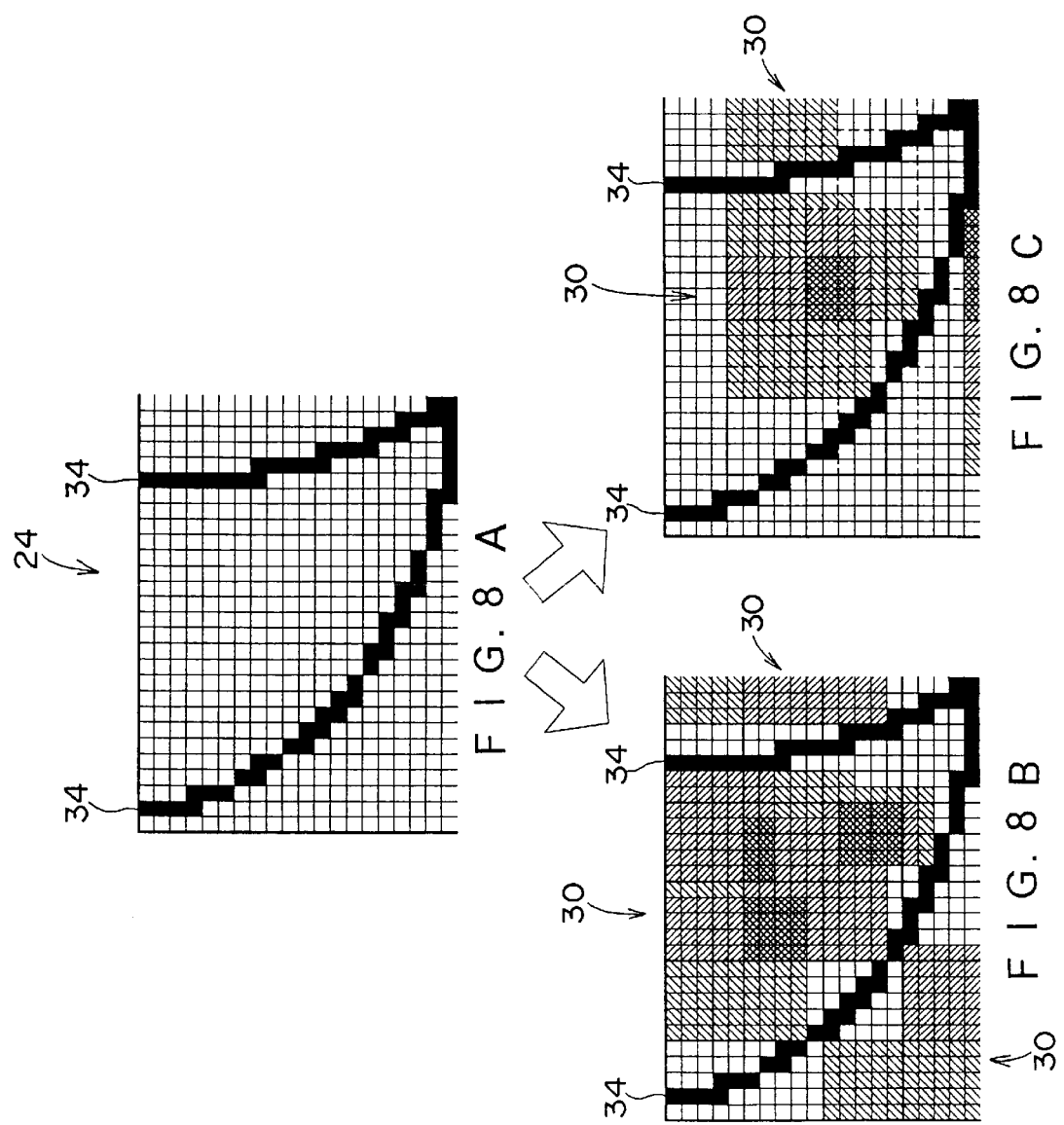
FIGS. 8A through 8C are views for explaining about smoothed regions.

FIGS. 8A and 8C show examples of smoothed regions 30 which are subjected to smoothing processing in accordance with the above processings. FIG. 8A shows the edge image 24 which is generated at edge detection. As illustrated in FIG. 6A, the edge image 24 is an image which includes the edge pixels 34. The edge image 24 is referred to and is subjected to the smoothing processing by an extending filter, in which the parameters of, for example, filter size=5, offset=0, overlap=0, as shown in FIG. 5A, are initially set values. Accordingly, as illustrated in FIG. 8B, only the region excluding the edge pixels 34 becomes a smoothed region 30 (region denoted by hatches in the drawings).

Moreover, similarly, the smoothing processing is carried out by an extending filter, in which the parameters of, for example, filter size=7, offset=4, overlap=2, as shown in FIG. 5C, are initially set values. Accordingly, as illustrated in FIG. 8C, only the region excluding the edge pixels 34 becomes a smoothed region 30 (region denoted by hatches in the drawings).

Next, a concrete processing will be described with reference to a flowchart shown in FIG. 9. The processings which are the same as those described in the previous first embodiment are denoted by the same reference numerals, and detailed description thereof is omitted.

First, as shown in FIG. 2, the edge detection is carried out and the edge image is generated (step 100). Then, the smoothing processing is carried out (step 102).

As illustrated in FIG. 9, in the smoothing processing, initial conditions of the extending filter, i.e., initial values of the above-described three parameters, are set (step 200). Next, the edge image 24 which was generated in the edge detection processing is referred to, and a determination is made as to whether an edge pixel exists in a noticed region 26 by the smoothing filter which was set in the initial setting (step 202).

Then, if the edge pixel exists in the noticed region 26, it is determined that the noticed region 26 is a region which is not the object of the smoothing processing, and the process goes to a subsequent processing. On the other hand, if the edge pixel does not exist in the noticed region 26, extending of the noticed region 26, i.e., extending of the size of the smoothing filter, is carried out referring to the edge image 24 (step 300). The extending of the noticed region 26 is carried out, for example, by extending the region from the initially set region one pixel by one pixel in a horizontal direction and a vertical direction.

Then, a determination is made as to whether the edge pixel exists in the extended region (step 302). If the edge pixel does not exist in the extended region, the noticed region 26 is further extended one pixel by one pixel longitudinally and laterally, and the determination which is the same as the one described above is effected (steps 300 and 302).

On the other hand, if it is determined that the edge pixel exists in the extended region, the noticed region 26 at that point is determined as the smoothed region (step 304). Then, the smoothing processing is carried out by replacing all of the pixel values in the determined smoothed region with the mean value of the noticed region (step 204).

Next, a determination is made as to whether the image scanning ends, i.e., the smoothing processing is completed for all of the smoothed regions 30 (step 206). If the image scanning does not end, the processings in steps 202, 300, 302, 204, and 206 are repeated.

On the other hand, if the smoothing processing is completed for all of the smoothed regions 30, a determination is made as to whether the above-described processings are completed for all of the smoothing filters (step 208). If the processings are completed, the present processing ends.

On the other hand, if the above-described processings are not completed for all of the smoothing filters, the process returns to step 200. The next smoothing parameters are set, and the processing which is the same as the one described above is effected. Hereinafter, the smoothing processing is successively carried out in the same manner. When the smoothing processing by an ultimate smoothing filter is performed, the present processing ends.

As described above, a region having a large surface area can be efficiently smoothed by using the smoothing filter which extends the region to be smoothed on the basis of the edge image.

Figure 10A:
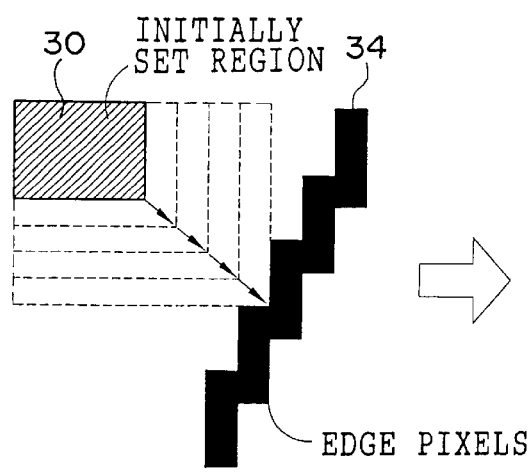
FIGS. 10A through 10D are views for explaining about an extending filter.
Figure 10B:
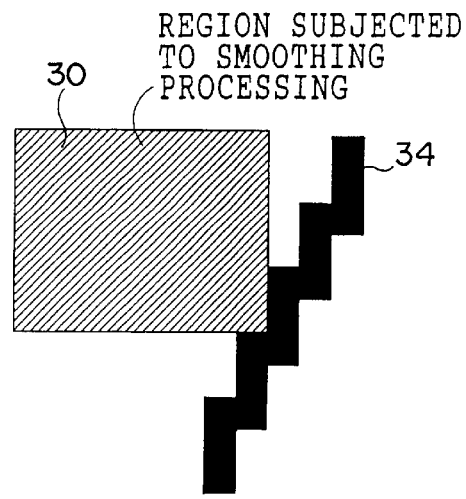
Figure 10C:
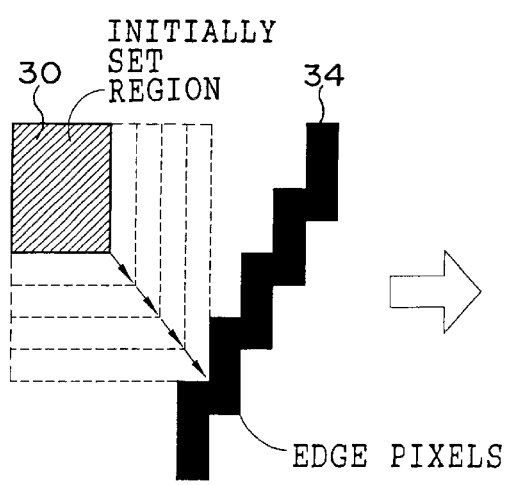
Figure 10D:
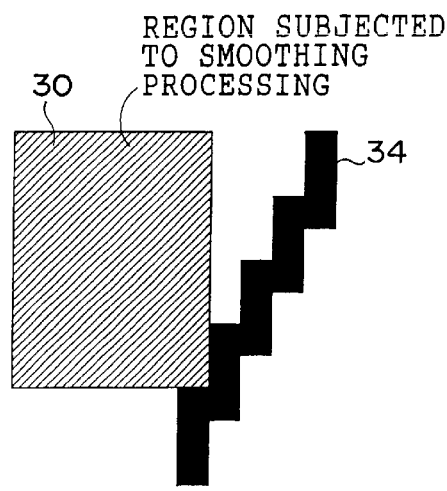

In the present embodiment, description is given of a case in which the square region which is subjected to the smoothing processing is extended equally in the horizontal direction and the vertical direction. However, the present invention is not limited to the same. For example, it is possible that a rectangular smoothed region 30, as shown in FIG. 10A, is extended to form a similar configuration, as shown in FIG. 10B. Alternatively, it is possible that a rectangular smoothed region 30, as shown in FIG. 10C, is extended to form a dissimilar configuration, as shown in FIG. 10D.

Third Embodiment

Next, a third embodiment of the present invention will be explained. The extending filter described in the above-described second embodiment is extremely efficient when the non-edge region having a large surface area is smoothed. However, when a character or the vicinity of an intricate edge is processed, it is effective to reduce the filter size of the smoothing filter as described in the previous first embodiment and to process. Accordingly, in the present embodiment, description will be given of a case in which more effective smoothing processing is carried out by combining the two filters and effecting the smoothing.

FIG. 11 shows the flow of a smoothing processing when the smoothing filter described in the first embodiment (hereinafter, "ordinary filter") and the extending filter described in the second embodiment are used. The processings which are the same as those described in the second embodiment are denoted by the same reference numerals, and the detailed description thereof is omitted.

As illustrated in FIG. 11, first, smoothing conditions are set (step 200). The data on smoothing filters which are used in the present embodiment is shown hereinafter.

TABLE 2

| No. | Filter Size | Offset | Overlap | Remark |
|---|---|---|---|---|
| 1 | 13 | 0 | 0 | Extending Filter |
| 2 | 11 | 3 | 2 | |
| 3 | 8 | 2 | 5 | |
| 4 | 5 | 2 | 3 | |
| 5 | 2 | 1 | 1 | |
| 6 | 2 | 0 | 0 | |

As illustrated in FIG. 2, the smoothing filter of filter No. 1, i.e., the smoothing filter which is set first, is an extending filter having parameters of filter size=13, offset=0, and overlap=0. The parameters of subsequent filters No. 1 to No. 6 are ordinary filters described in the first embodiment.

Consequently, in the above-described setting of the smoothing conditions (step 200), first, the extending filter of filter No. 1 is set.

Next, the type of filter is determined, i.e., a determination is made as to whether the set filter is an ordinary filter or an extending filter (step 306). Then, if it is determined that the ordinary filter is set, the smoothing processing by the ordinary filter, which is the same as the one described in the first embodiment, is carried out (step 308). Namely, the respective processings in steps 202 to 206 shown in FIG. 3 are effected.

On the other hand, if it is determined that the extending filter is set, the smoothing processing by the extending filter, which is the same as the one described in the second embodiment, is carried out (step 308). Namely, the respective processings in steps 202, 300, 302, 304, 204, and 206 shown in FIG. 9 are effected.

Next, a determination is made as to whether the above-described processings are completed for all of the smoothing filters (step 208). If the above-described processings are not completed for all of the smoothing filters, the process returns to step 200. The next smoothing parameters are set, and the processing which is the same as the one described above is effected. Hereinafter, the smoothing processing is successively carried out in the same manner. When the smoothing processing by the ultimate smoothing filter is carried out, the present processing ends.

As described above, the smoothing processing is effected by combining the ordinary filter and the extending filter, which extends the region to be smoothed on the basis of the edge information. Thus, even if the image includes characters, intricate edges, or the like, the image can be efficiently smoothed.

Fourth Embodiment

Next, a fourth embodiment of the present invention will be explained. In the present embodiment, description will be given of a case in which an input image is subjected to a contraction processing so that images having a plurality of resolutions are generated, and a smoothing processing having different conditions is effected to each of the plurality of levels of images.

Figure 12:
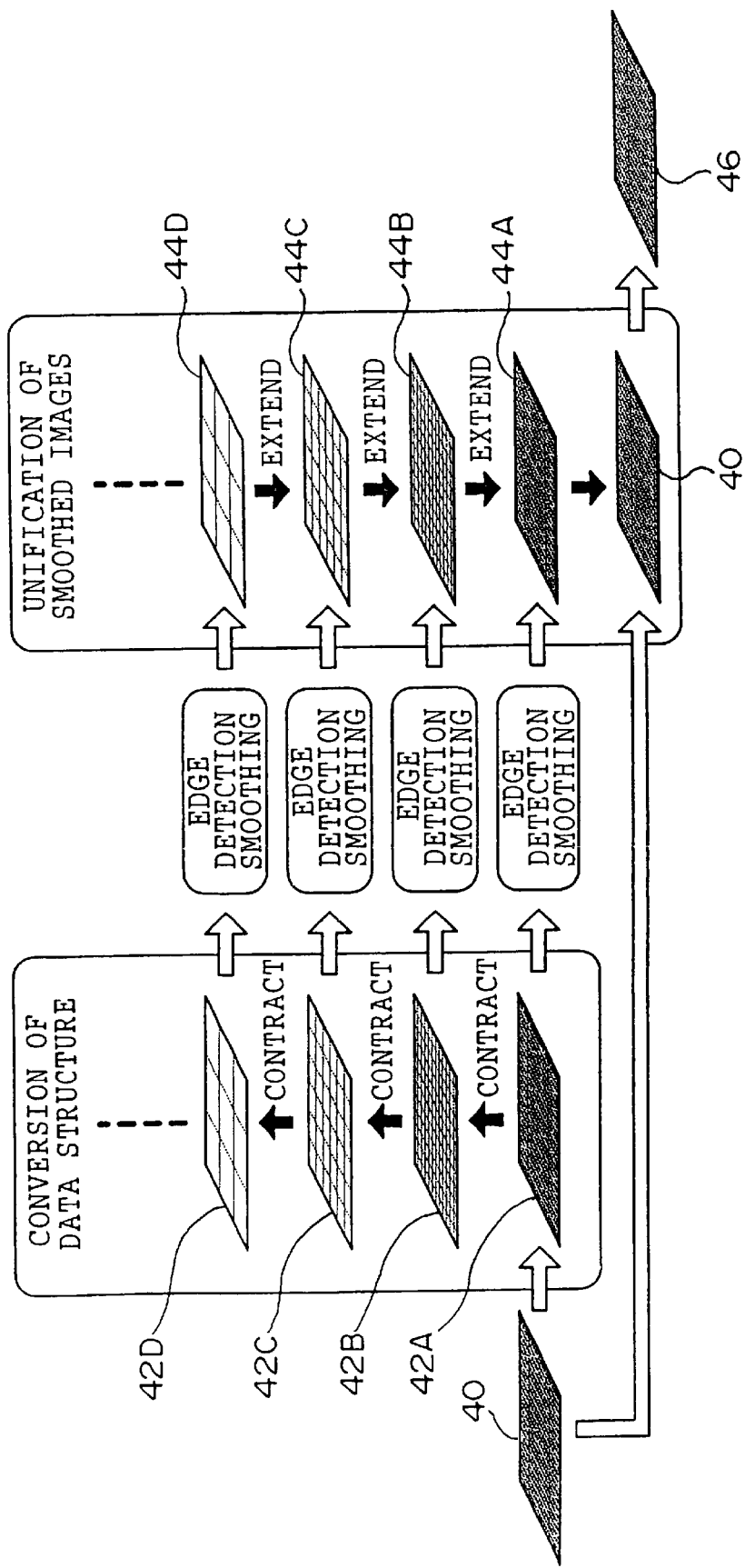
FIG. 12 is a view for explaining about the concept of a smoothing processing.

As illustrated in FIG. 12, in the present embodiment, an input image 40 is subjected to the contraction processing, and converted images 42A, 42B, 42C, 42D, . . . having a plurality of resolutions are generated. Then, using the respective generated converted images, when a wide reference region is required, the converted image having a low resolution, e.g., the converted image 42D, is subjected to smoothing processing, such that a smoothed image 44D is generated. When it is necessary to effect the smoothing processing in a narrow reference region such as a character, the vicinity of an edge, or the like, the image having a high resolution, e.g., the converted image 42A, is subjected to the smoothing processing, such that a smoothed image 44A is generated. Then, an ultimate processed image 46 is obtained by unifying the plurality of smoothed images.

Figure 13:
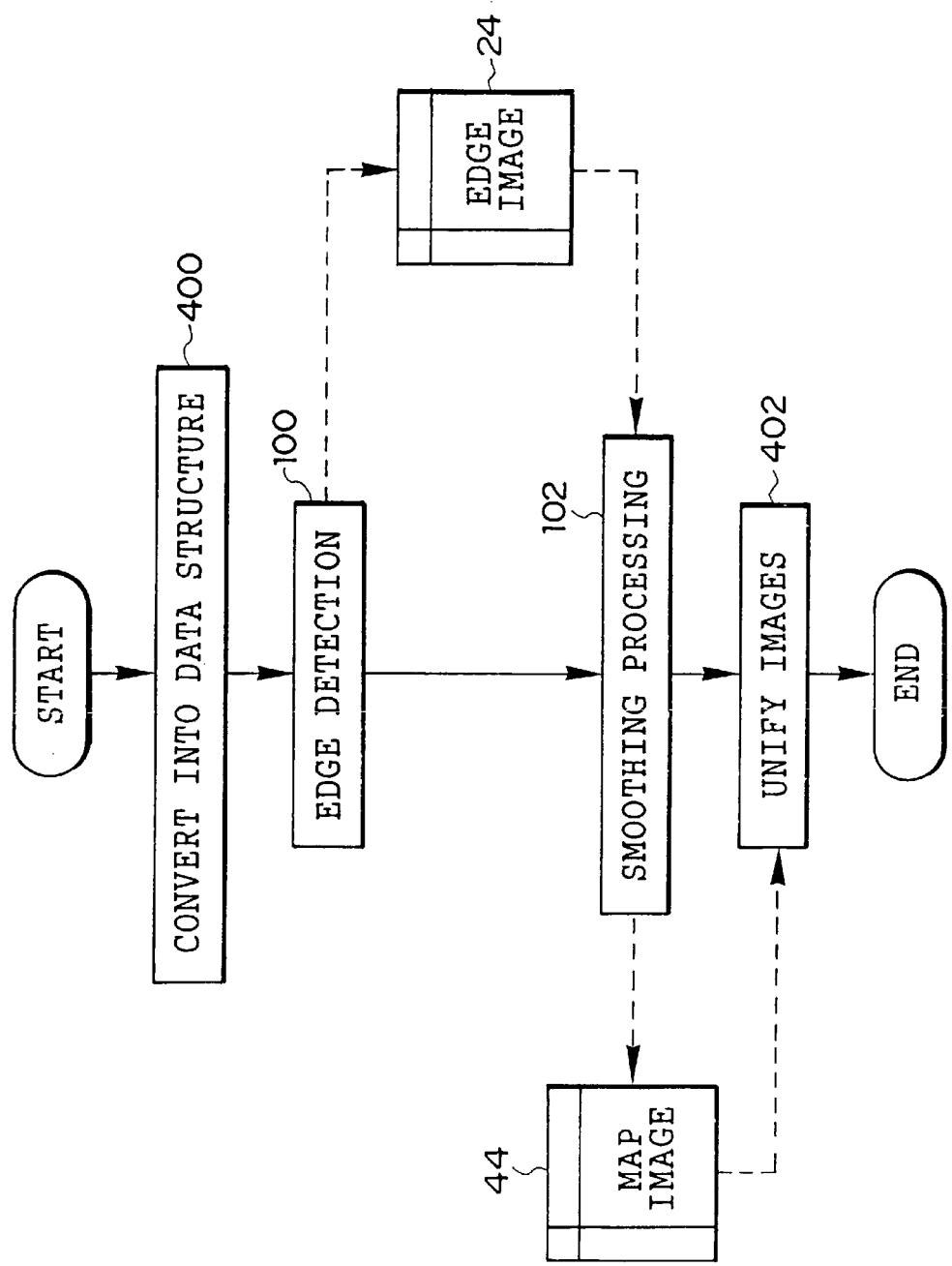
FIG. 13 is a flowchart which shows the flow of an image processing.

Next, the concrete flow of an image processing will be described with reference to a flowchart shown in FIG. 13. The processings which are the same as those described in the above embodiments are denoted by the same reference numerals, and detailed description thereof is omitted.

First, the input image 40, which was input from the image input means 12, is subjected to a resolution conversion processing to form an internal data structure (step 400). FIGS. 14A through 14C show concrete examples of the resolution conversion. In the drawings, A to I denote pixel values of respective pixels. In order to contract an image having a predetermined level K shown in FIG. 14A by, for example, 50% and generate an image having one higher level (having a low resolution) (K+1) shown in FIG. 14B, as shown in FIG. 14A, the sum of four pixels which are formed by two by two pixels makes one block 50, and the mean value of the pixel values within the block 50, i.e., E=(A+B+C+D)/4, is obtained. The obtained mean value E is a pixel value of one pixel of the level (K+1) image. By carrying out the operation to all of the level K images, the level (K+1) images in which the level K images were contracted by 50% are generated.

Figure 14:
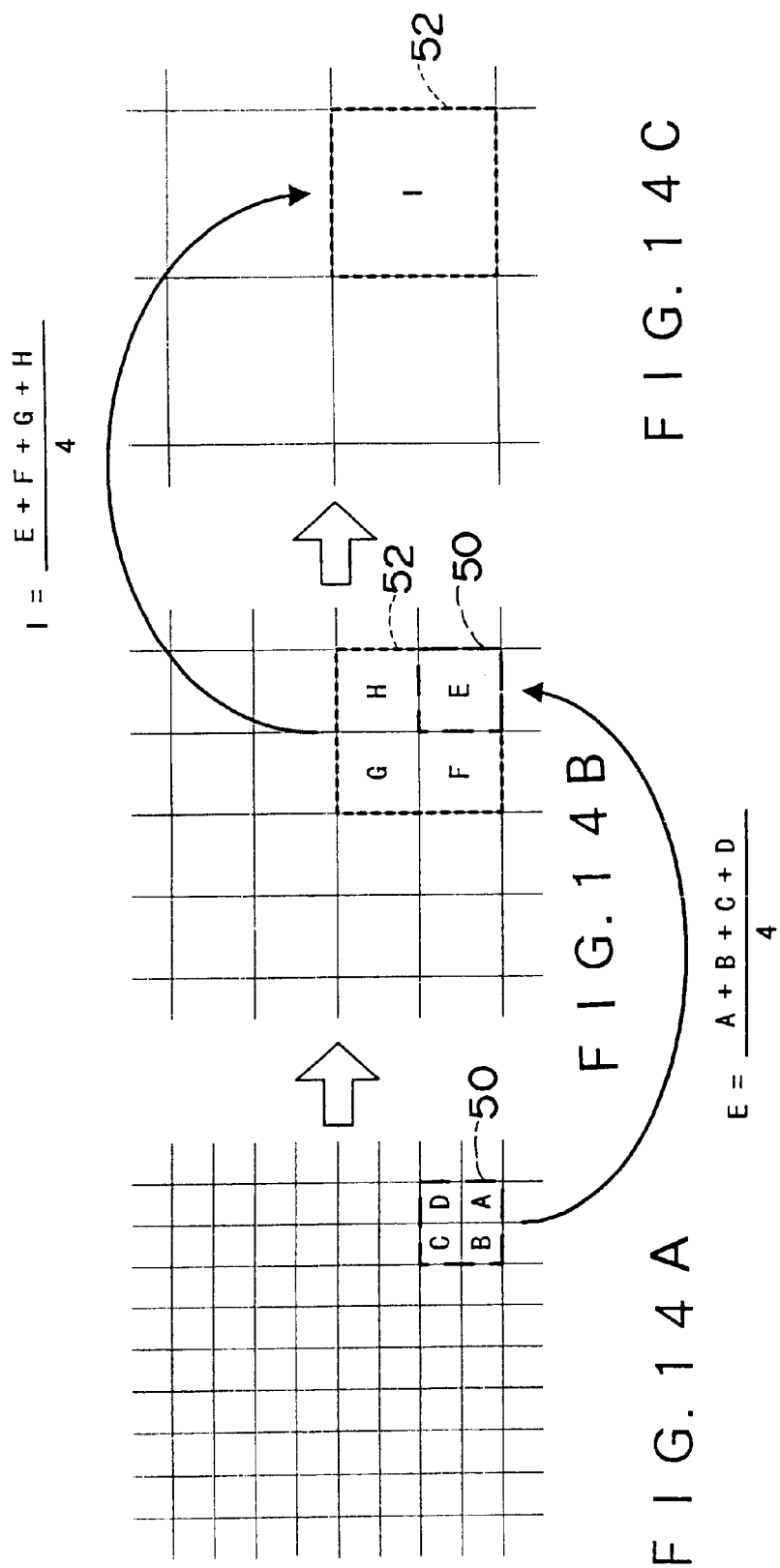
FIGS. 14A through 14C are views for explaining about resolution conversion.

Similarly, in order to contract the level (K+1) image shown in FIG. 14B by, for example, 50% and generate an image having one higher order level (K+2) shown in FIG. 14, as shown in FIG. 14B, the sum of four pixels which are formed by two by two pixels makes one block 52, and the mean value of the pixel values within the block 52, i.e., I=(E+F+G+H)/4, is obtained. The obtained mean value I is a pixel value of one pixel of the level (K+2) image. By carrying out the operation to all of the level (K+1) images, the level (K+2) images in which the level (K+1) images were contracted by 50% are generated. The rate of contraction is not limited to 50% and can be set arbitrarily.

Figure 15:
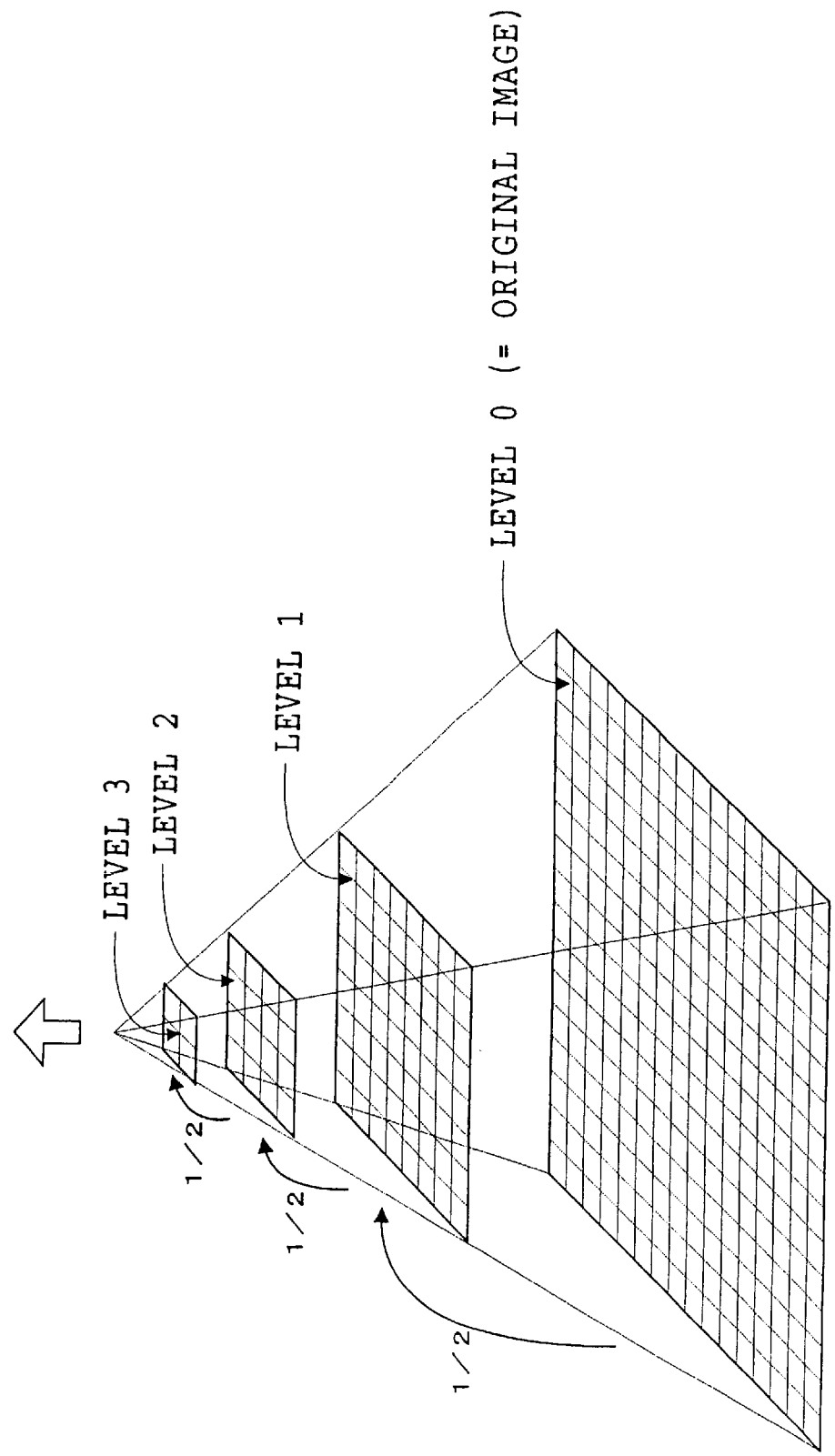
FIG. 15 is a view for explaining about the resolution conversion.
Figure 16:
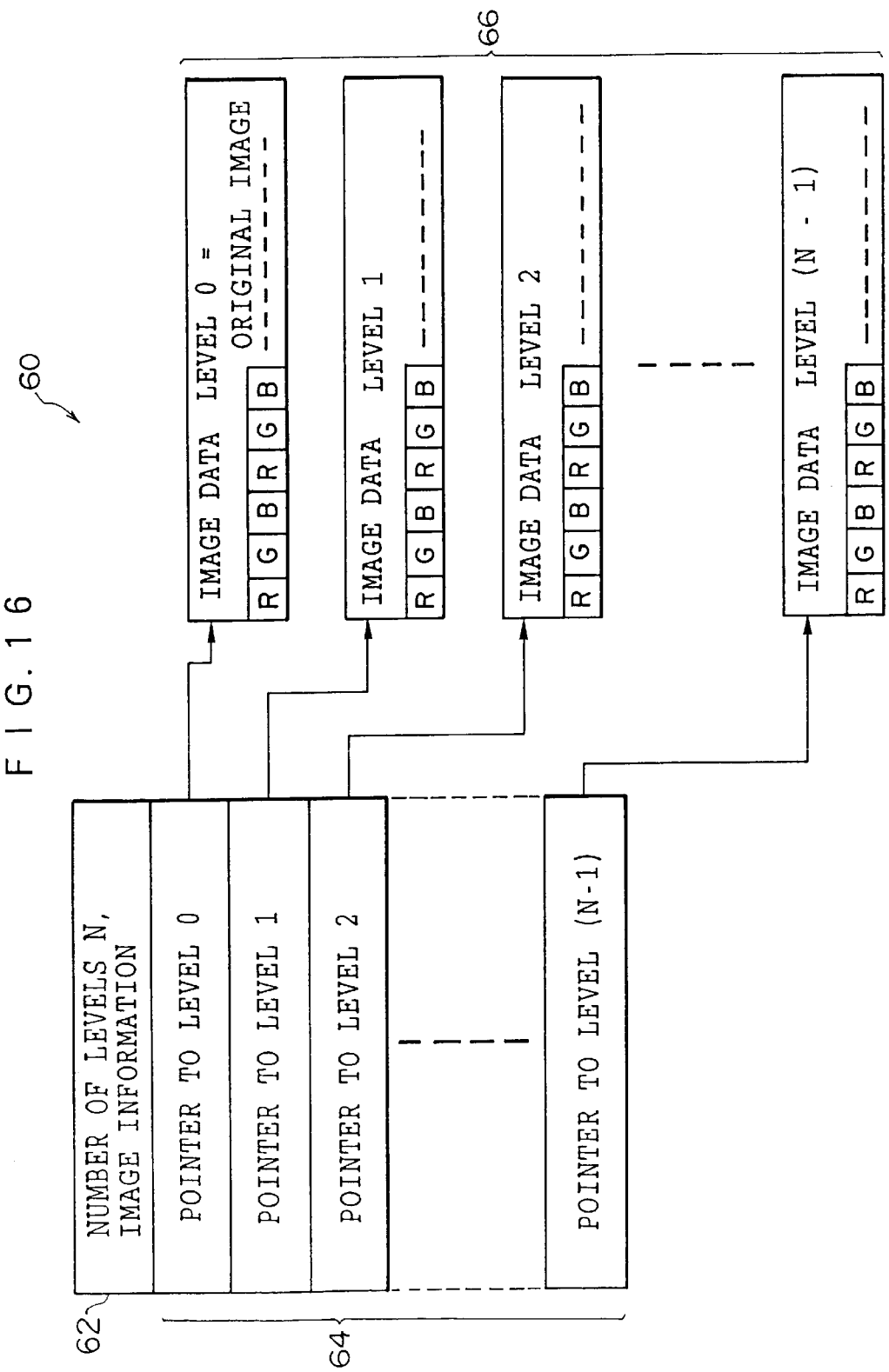
FIG. 16 is a view which shows the formation of an internal data structure.

By effecting the processing, a plurality of levels of images having different resolutions as shown in FIG. 15 are generated. As illustrated in FIG. 15, in the present embodiment, the resolution of the input image (original image) is level 0, the resolution of the input image which was subjected to 50% contraction processing is level 1, the resolution of the level 1 image which was subjected to 50% contraction processing is level 2, and thereafter, level 3, level 4, . . . are generated in the same manner. Consequently, the higher the level (the higher order the level), the lower the resolution of the image, and conversely, the lower the level (the lower order the level), the higher the resolution of the image.

The formation of an internal data structure 60 which is generated as a result of the resolution conversion effected in this way is shown. The internal data structure 60 is formed by a header information 62 and a pointer information 64.

The header information 62 is formed by image information and the number of images which are generated in the resolution conversion, i.e., the number N of levels The image information includes information such as the width, the height, and the number of bits per one pixel of an input image, or the like.

The pointer information 64 is formed by pointers (addresses) having the number N of levels. The pointer is an address to an image data 66 of a corresponding level, and more specifically, to a region in which the respective pixel values of R, G, and B are stored. By referring to the pointer, it is possible to know which address contains the image data 66 of a corresponding level.

Next, each generated level of image is subjected to an edge detection processing (step 100), such that an edge image 24 is generated. Then, referring to the generated edge image, the smoothing processing is effected (step 102).

The edge detection processing and the smoothing processing which are carried out herein are the same as those described in the first embodiment and the second embodiment. The processing parameter includes, for example, counting of an edge detection operation which is used in the edge detection or a threshold value parameter which is used in the edge determination. The settings of a smoothing filter which is used in the smoothing processing are, i.e., various types of parameters such as "filter size", "offset", and "overlap" of an ordinary smoothing filter or an extending filter and the combinations thereof. The processing parameter and the various types of parameters are set to each level independently.

An example of data on the smoothing filters is shown as follows.

TABLE 3

| No. | Level | Filter Size | Offset | Overlap | Remark |
|---|---|---|---|---|---|
| 1 | 3 | 22 | 0 | 0 | Extending Filter |
| 2 | | 11 | 3 | 2 | |
| 3 | | 8 | 4 | 5 | |
| 4 | 2 | 17 | 0 | 0 | Extending Filter |
| 5 | | 14 | 2 | 5 | |
| 6 | | 8 | 0 | 3 | |
| 7 | | 5 | 1 | 0 | |
| 8 | 1 | 8 | 2 | 5 | |
| 9 | | 5 | 3 | 0 | |
| 10 | | 3 | 1 | 1 | |
| 11 | | 2 | 0 | 1 | |
| 12 | 0 | 3 | 0 | 2 | |
| 13 | | 2 | 0 | 1 | |

In this example, the data shows that the level 3 image and the level 2 image, which have comparatively low resolutions, are subjected to the smoothing processing in combination of the extending filter and the ordinary filter, and that the level 1 image and the level 0 image, which have comparatively high resolutions, are subjected to the smoothing processing using the ordinary filter. Further, if the image having a high resolution is subjected to the smoothing processing by the filter having a large filter size, the processing time is long, and therefore, the processing is inefficient. Accordingly, the filter size of the filter which is used for the image having a high resolution is comparatively small and the filter size of the filter which is used for the image having a low resolution is comparatively large. In Table 3, the number of levels is four, i.e., 0 to 3. However, the number of levels is not limited to the same, and the number of levels may be larger or smaller.

In the smoothing processing, for example, the corresponding level of image is subjected to the smoothing processing by each filter shown in Table 3. Then, a map image (smoothed image) 44 which is required in an image unification processing, which will be described later, is generated from each level of the processed image. The map image 44 is, for example, a binary image information which was subjected to the smoothing processing.

Figure 17A:
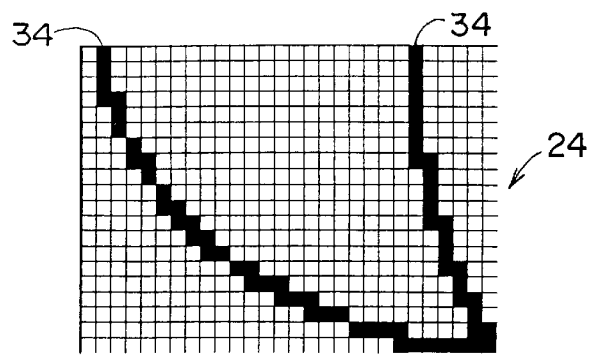
FIGS. 17A through 17F are views for explaining about a map image.
Figure 17B:
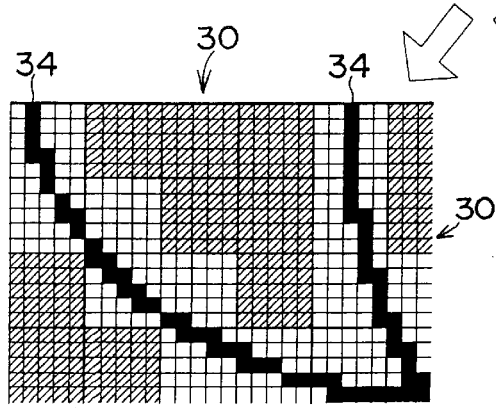
Figure 17C:
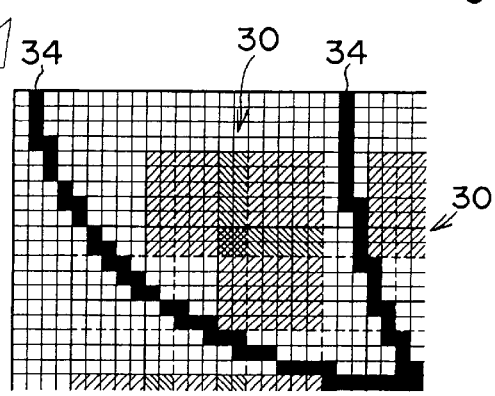
Figure 17D:
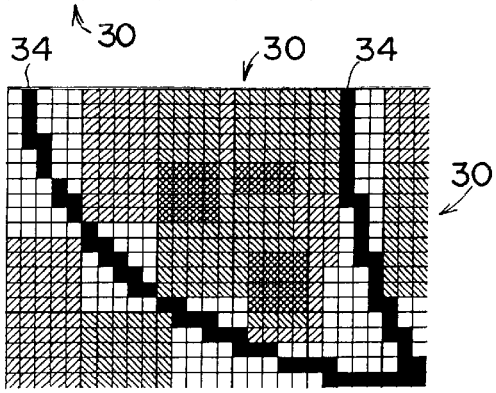
Figure 17E:
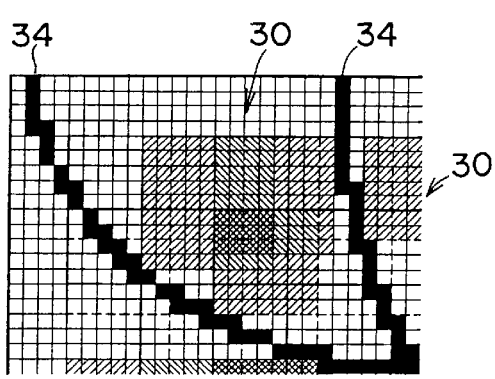
Figure 17F:
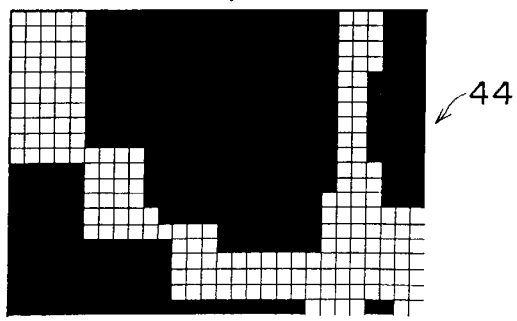

FIG. 17F shows an example of the map image 44 when a predetermined level of image is subjected to the smoothing processing. FIG. 17A shows the edge image 24 which was generated in the edge detection. As illustrated in FIG. 17A, the edge image 24 is an image which includes edge pixels 34. The edge image 24 is referred to and is subjected to the smoothing processing by an ordinary filter, which is defined by the parameters of, for example, filter size=5, offset=0, overlap=0, as shown in FIG. 5A. Accordingly, as illustrated in FIG. 17B, only the region excluding the edge pixels 34 becomes a smoothed region 30 (region denoted by hatches in FIG. 17B).

Moreover, the smoothing processing is carried out by an ordinary filter which is defined by the parameters of, for example, filter size=7, offset=4, overlap=2, as shown in FIG. 5C. Thus, as illustrated in FIG. 17C, only the region excluding the edge pixels 34 becomes a smoothed region 30 (region denoted by hatches in FIG. 17C).

Further, the smoothing processing is carried out by an extending filter in which the parameters of, for example, filter size=5, offset=0, overlap=0, as shown in FIG. 5A, are initial values. Consequently, as illustrated in FIG. 17D, only the region excluding the edge pixels 34 becomes a smoothed region 30 (region denoted by hatches in FIG. 17D).

Furthermore, the smoothing processing is carried out by an extending filter in which the parameters of, for example, filter size=7, offset=4, overlap=2, as shown in FIG. 5C, are initial values. Accordingly, as illustrated in FIG. 17E, only the region excluding the edge pixels 34 becomes a smoothed region 30 (region denoted by hatches in the drawings).

Then, as illustrated in FIG. 17F, the map image 44 is obtained by finding the logical sum of pixels in the respective smoothed regions 30, which were subjected to the above-described four types of filter processings (region which is painted over with black in the drawings).

Next, the generated map image 44 is referred to, and the images of the respective levels are unified (step 402). FIGS. 18A through 18E show the map images 44 which were generated at respective levels and were subjected to the smoothing processing. FIG. 18A shows the edge image 24. FIGS. 18B, 18C, 19D and 18E respectively show map images 44A, 44B, 44C and 44D in which the level 0, 1, 2 and 3 converted image was subjected to the smoothing processing.

In the image unification processing, as illustrated in FIG. 12, first, a processing which extends the respective map images 44 is effected. FIGS. 19B, 19C, 19D and 19E show an extended map image serving as a converted and smoothed image in which the map image illustrated in FIGS. 18B, 18C, 18D and 18E is extended, respectively.

Figure 19A:
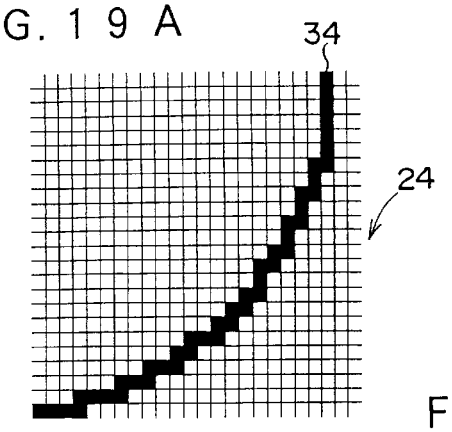
FIGS. 19A through 19F are views for explaining about image unification.
Figure 19E:
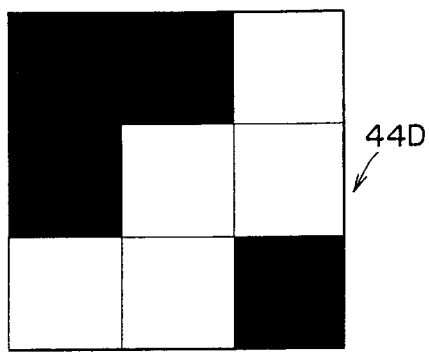
Figure 19D:
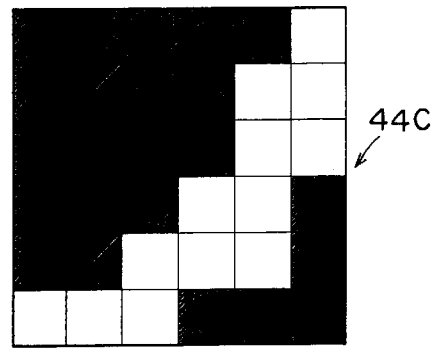
Figure 19C:
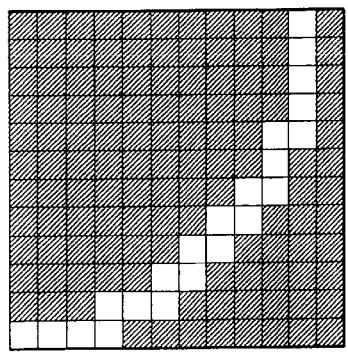
Figure 19B:
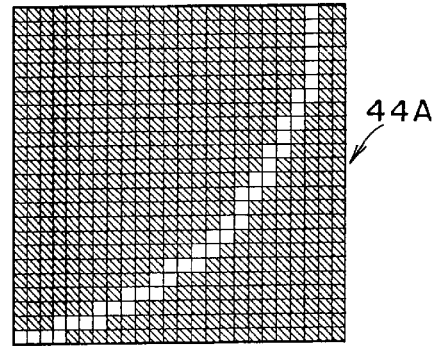
Figure 19F:
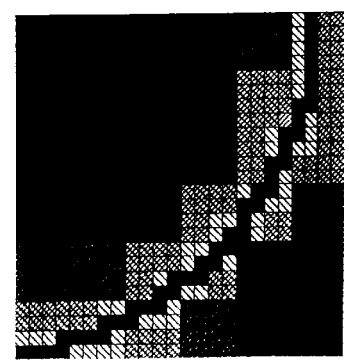

In this way, the resolutions of all of the map images 44 are the same. Thereafter, the respective map images 44 are referred to, and the pixel values of respective pixels in the smoothed region 30 are written on the input image 40. Accordingly, the image unification completes, and an ultimate processed image 46, as illustrated in FIG. 19F, is generated.

In this way, the converted image having a resolution which is lower than the input resolution is generated from the input image. The smoothing processing is effected independently to the converted images having plurality of types of resolutions by using different types of filters, i.e., the filter having a small filter size is used for the image having a high resolution, and the filter having large filter size is used for having a high resolution, and the filter having large filter size is used for the image having a low resolution. By synthesizing the input image and the images which were subjected to the smoothing processing, the smoothed image can be obtained efficiently.

Fifth Embodiment

Figure 20A:
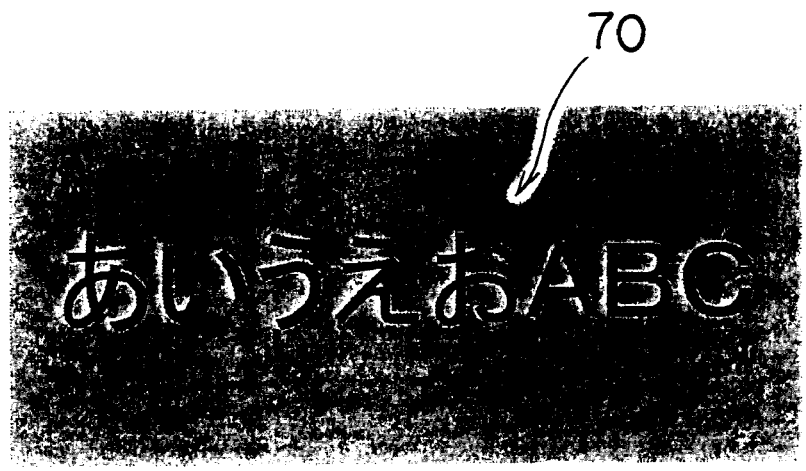
FIGS. 20A and 20B are views which show an example of a document image which includes characters and segment elements.
Figure 20B:
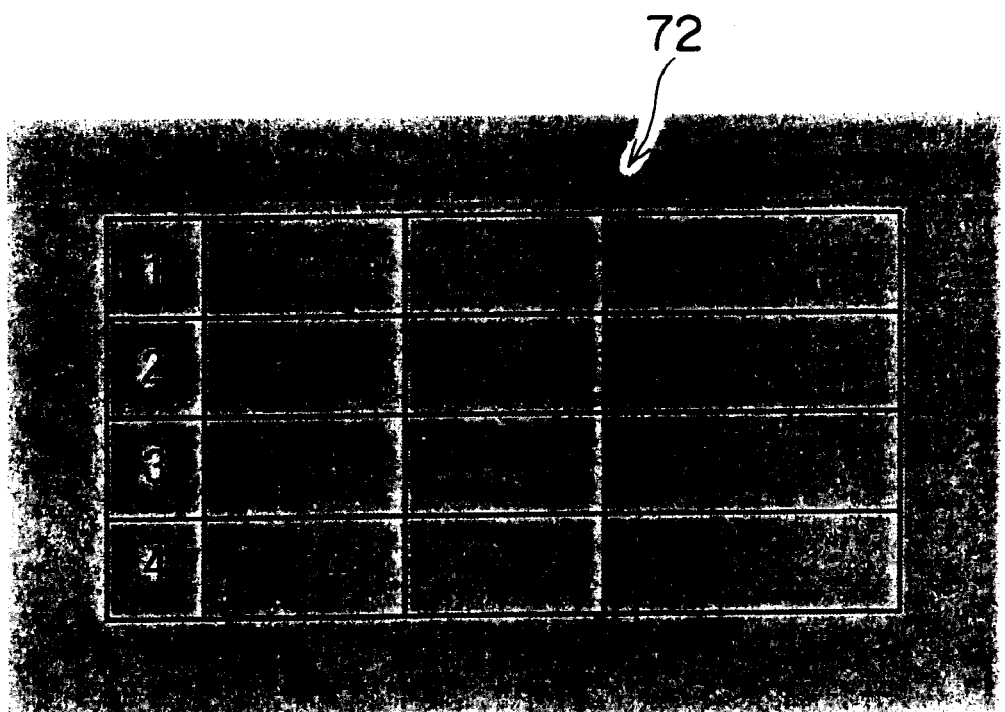

Next, a fifth embodiment of the present invention will be explained. The present invention aims at improving the quality of a document image by effecting a smoothing processing to a region which has a large surface area and in which fluctuation of pixel values is small. However, in the document image, there is often a case in which characters 70 are included as illustrated in FIG. 20A or a case in which a document forming element such as a table/ruled lines 72 exists in a region to be smoothed as illustrated in FIG. 20B.

Therefore, in the present embodiment, description will be given of a case in which a processing for reproducing an image, in which a line element is included in the object of smoothing processing, with higher quality is effected.

As illustrated in FIG. 21, first, a segment element is extracted from an input image 40, and the input image 40 is separated into a segment image 74 and a difference image 76, which has eliminated the segment element from the input image. Thereafter, the difference image 76 is subjected to an edge detection processing, and an edge image 24 is generated. Then, the edge image 24 and the difference image 76 are subjected to resolution conversion, and a plurality of converted images are generated. The respective converted images are subjected to the smoothing processing, and smoothed images are generated. The smoothed images are unified, and the segment image 74 is subjected to a subtractive color processing. Then, the segment image which was subjected to the subtractive color processing and the unified smoothed image are unified, such that an ultimate processed image 46 is obtained.

Next, the flow of a concrete image processing will be described with reference to a flowchart shown in FIG. 22. The processings which are the same as the processings described in the previous embodiments are denoted by the same reference numerals, and detailed description thereof is omitted.

First, the input image 40, which was input from the image input means 12, is subjected to a segment element extraction processing (step 500). There is a large number of known methods of extracting a segment element. In the present embodiment, two known methods, i.e., a floating binary processing and an isolated noise elimination processing, are used.

In the floating binary processing, the difference between a noticed pixel and the mean color of peripheral pixels is compared to a predetermined threshold value. If the difference in color exceeds the predetermined threshold value, the noticed pixel is a candidate for the segment element. The peripheral region to be referred at this time depends on the size of a character/segment element to be extracted or the resolution of the input image. However, in case of the document image which is a primary object of application in the present invention, in general, the input resolution is 200 to 400 dpi (dot per inch), and the size of a character in the document is approximately 6 to 50 points. Consequently, it is preferable that the peripheral region to be referred is approximately, for example, from a 21 by 21 pixels to 51 by 51 pixels. Further, in order to obtain the difference in color, for example, a three dimensional distance between the two colors in a color space of R, G, and B is used.

The segment element candidate which was extracted in the above processing is subjected to the isolated noise elimination processing. The processing eliminates a segment element candidate which was erroneously detected, such as stains or dots in the document. The determination of isolated noise is as follows. For example, in a peripheral seven by seven pixel region of the pixels of the noticed segment element candidate, the pixel number of pixels which were extracted as the segment element candidate and the frequency of reversal of extraction/non-extraction are counted. If the pixel number is smaller than a predetermined threshold value, or if the frequency of reversal exceeds a predetermined threshold value, the pixel is determined as a noise component which was erroneously extracted, and is thereby eliminated from the segment element candidate. In accordance with the above-described processing, the segment element is extracted from the input image.

Next, the extracted segment element is referred to, and an image separation processing which separates the input image 40 into the segment image 74 and the difference image 76 is carried out (step 502). FIGS. 23A through 23D show an example of the segment image 74 and the difference image 76. When the segment element is extracted from the input image 40 as illustrated in FIG. 23A, the segment image 74 as shown in FIG. 23B is obtained. Then, the segment element 74 is eliminated from the input image 40, and an image as shown in FIG. 23C is generated. The pixel values of the eliminated pixels are replaced with values which interpolate from the peripheral pixels, such that the difference image 76 as shown in FIG. 23D is obtained.

The difference image 76 is converted into an internal data structure having a plurality of resolutions in a data structure conversion processing (step 400). In this way, as illustrated in FIG. 21, converted difference images 76A, 76B, 76C, 76D, . . . are generated. Further, the difference image 76 is subjected to the edge detection processing (step 100), such that the edge image 24 is generated. The edge image 24, which was detected in the edge detection processing, is subjected to the contraction processing (data structure conversion processing) in the same way as in the difference image 76. As illustrated in FIG. 21, converted edge images 24A, 24B, 24C, 24D, having the same number as that of the converted difference images are generated (step 504).

Figures 24A, 24B, 24C:
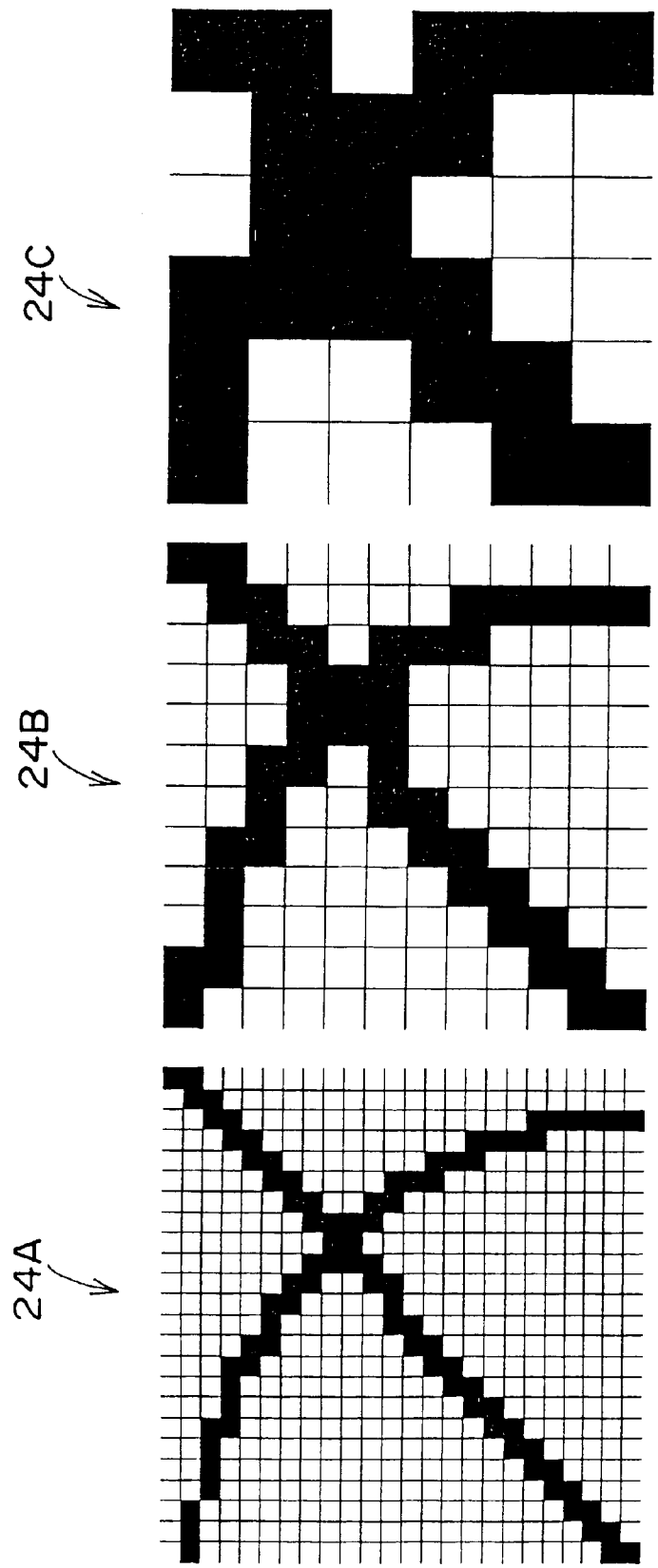
FIGS. 24A through 24C are views for explaining about an edge image contraction processing.

FIGS. 24A through 24C show examples of the edge images. FIG. 24A shows the edge image 24, FIG. 24B shows a converted edge image 24B, and FIG. 24C shows a converted edge image 24C. The contraction processing (step 504) of the edge image 24 is effected by, for example, finding the logical sum of four pixels. Namely, the logical sum of pixel values of 2 by 2 pixels in the edge image 24 shown in FIG. 24A is obtained, and the value of the logical sum is one pixel value of the edge image 24B shown in FIG. 24B. In this way, the converted edge image 24B, which contracts the edge image 24 by 50%, i.e., which has the ½ resolution of the edge image 24, is obtained. Similarly, the converted edge image 24C as shown in FIG. 24C can be generated from the edge image 24B.

Since the data structure conversion of the edge image 24 is carried out in accordance with the above-described processing, a case in which pixels which are edge-detected in one level of the image are not edge-detected in a different level of the image can be prevented, and alternatively, a case in which pixels which are not edge-detected in one level of the image are edge-detected in a different level of the image can be prevented. In this way, when the smoothed images are unified, mismatches can be prevented.

Then, the converted edge images and the converted difference images which are generated in this way are subjected to the smoothing processing (step 102), such that respective levels of map images 44 (smoothed images) are generated. Then, the plurality of levels of map images 44 are image-unified (step 402).

On the other hand, the segment image 74 is subjected to the subtractive color processing (step 506). Here, for example, a processing, which detects a black pixel in the segment element 74 and replaces the pixel with a pure black, i.e., respective pixels values of R, G, and B are replaced as R=G=B=0, is carried out. This is a processing for expressing black characters or black lines in the document image more desirably, and a distance in a three-dimensional color space between black and the color of each pixel in the segment image 74 is compared to a predetermined threshold value. If the distance is smaller than the predetermined threshold value, i.e., it is determined that the color is sufficiently close to black, the pixel values are replaced as R=G=B=0. The subtractive color processing is thereby realized.

The subtractive color processing is not limited only to black. In addition to black, the same processing may be effected to pure colors such as white, red, blue, green, yellow, magenta, cyan, or the like. In order to improve the quality of the document image, it is extremely efficient to reproduce the pixels of the pure colors accurately. Moreover, by carrying out various types of proposed subtractive color processings to the segment image, in addition to the color which was determined in advance, the quality of a character or segment element having a specific color can improve adaptively in accordance with the processed image.

Then, the segment image, which was subjected to the subtractive color processing, is written on the unified smoothed image, such that the ultimate processed image 46 is generated (step 508).

In this way, the input image is separated into the segment image and the difference image, the segment image and the difference image are subjected to the resolution conversion and the smoothing processing, and the processed images are unified. Accordingly, even in a document in which segment elements such as characters, ruled lines, or the like exist in the region which is subjected to the smoothing processing, the good image quality can be obtained.

Effects of the Invention

As described above, in accordance with the present invention, a superior effect is achieved in that, even if an image, such as a document image or the like, which has a great number of regions having a comparatively large surface area and the same color is scan-read, the quality of the read image can improve.

What is claimed is:

1. An image processing apparatus, comprising:
    edge detection unit that detects an edge from an input image, the input image having been read by an image reading unit that scan-reads an image; and
    smoothing unit that carries out a plurality of smoothing processings, and in the smoothing processing, said smoothing unit selects one smoothing condition from a plurality of smoothing conditions, which have been determined in advance and which include a region to be processed which is smaller than the input image, an amount of movement of the region to be processed, and a range of scanning in the input image, and on the basis of the selected smoothing condition, said smoothing unit smoothes an interior of the region to be processed in the input image, in which the edge is not detected, while moving and scanning the region to be processed within the range of scanning by the amount of movement.

2. An image processing apparatus according to claim 1, further comprising:
    storing unit that stores the plurality of smoothing conditions which have been determined in advance.

3. An image processing apparatus according to claim 1, wherein said smoothing unit obtains a mean value of pixel values in the region to be processed, and said smoothing unit smoothes the interior of the region to be processed by replacing the pixel values in the region to be processed with the obtained mean value.

4. An image processing apparatus according to claim 1, wherein said smoothing unit obtains a central value of the pixel values in the region to be processed, and said smoothing unit smoothes the interior of the region to be processed by replacing the pixel values in the region to be processed with the obtained central value.

5. An image processing apparatus according to claim 1, wherein said smoothing unit determines whether the detected edge exists in the region to be processed, and if the edge does not exist, said smoothing unit extends the region to be processed.

6. An image processing apparatus according to claim 5, wherein said smoothing unit determines whether the detected edge exists in the region to be processed, and if the edge is non-existent, said smoothing unit repeats a processing for extending the region to be processed until it is determined that the edge exists, and when the edge exists in the extended region to be processed, said smoothing unit resets the last region to be processed as a region to be processed.

7. An image processing apparatus according to claim 5, wherein a size of the region to be processed is variable.

8. An image processing apparatus according to claim 1, further comprising:
    image generating unit that which generates a plurality of converted images having resolutions which are lower than the resolution of the input image,
    wherein said smoothing unit further generates a plurality of smoothed images by carrying out the plurality of smoothing processings on the plurality of converted images, and said smoothing unit respectively converts the plurality of generated smoothed images into converted smoothed images whose resolutions are the same as the resolution of the input image, and said smoothing unit synthesizes the input image and the converted smoothed images which have been respectively converted.

9. An image processing apparatus according to claim 1, further comprising:
    segment element extracting unit that extracts a segment element from the input image; and
    difference image generating unit that generates a difference image in which the segment element is excluded from the input image,
    wherein said smoothing unit carries out the plurality of smoothing processings on the difference image.

10. An image processing apparatus according to claim 9, wherein a pixel value of a pixel included in the segment element is compared to a pixel value of a specific color which has been determined in advance,
    and if the difference between the pixel value of the pixel included in the segment element and the pixel value of the specific color which has been determined in advance falls within a predetermined range, the pixel value of the pixel included in the segment element is replaced with the pixel value of the specific color.

11. An image processing apparatus according to claim 10, wherein the specific color is black.

12. An image processing apparatus according to claim 1, wherein the smoothing unit carries out the plurality of smoothing processings from a region to be processed with a larger size.

13. An image processing apparatus according to claim 1, wherein the input image comprises a document image which can include character information, a graph and a diagram.

14. A computer readable recording medium on which a program for executing processings is recorded, said program comprising:
    detecting an edge from an input image which has been read by an image reading unit that scan-reads an image; and
    carrying out a plurality of smoothing processings, and in the smoothing processing, a smoothing condition is selected from a plurality of smoothing conditions, which have been determined in advance and which include a region to be processed which is smaller than the input image, an amount of movement of the region to be processed, and a range of scanning in the input image, and on the basis of the selected smoothing condition, smoothing an interior of the region to be processed in the input image, in which the edge is not detected, while moving and scanning the region to be processed within the range of scanning by the amount of movement.

15. An image processing apparatus, comprising:

an edge detection unit that detects an edge from an input image, the input image having been read by an image reading unit that scan-reads an image; and smoothing unit that carries out a plurality of smoothing processings, and in the smoothing processing, said smoothing unit selects one smoothing condition from a plurality of smoothing conditions, which have been determined in advance and which include a region to be processed which is smaller than the input image, an amount of movement of the region to be processed, and a range of scanning in the input image, and on the basis of the selected smoothing condition, said smoothing unit smoothes an interior of the region to be processed in the input image, in which the edge is not detected, while moving and scanning the region to be processed within the range of scanning by the amount of movement, wherein each of the plurality of smoothing conditions includes, a filter size parameter for indicating a size of the region to be processed, an overlap parameter for indicating a width of an overlapped region of the region to be processed and a region to be processed after movement by the amount of movement, and an offset parameter for indicating a distance from an end portion of the input image to an end portion of the range of scanning.

16. A computer readable recording medium on which a program for executing processings is recorded, said program comprising:

detecting an edge from an input image which has been read by an image reading unit that scan-reads an image; and carrying out a plurality of smoothing processings, and in the smoothing processing, a smoothing condition is selected from a plurality of smoothing conditions, which have been determined in advance and which include a region to be processed which is smaller than the input image, an amount of movement of the region to be processed, and a range of scanning in the input image, and on the basis of the selected smoothing condition, smoothing an interior of the region to be processed in the input image, in which the edge is not detected, while moving and scanning the region to be processed within the range of scanning by the amount of movement, wherein each of the plurality of smoothing conditions includes, a filter size parameter for indicating a size of the region to be processed, an overlap parameter for indicating a width of an overlapped region of the region to be processed and a region to be processed after movement by the amount of movement, and an offset parameter for indicating a distance from an end portion of the input image to an end portion of the range of scanning.

* * * * *

UNITED STATES PATENT AND TRADEMARK OFFICE
CERTIFICATE OF CORRECTION

PATENT NO. : 6,901,170 B1
DATED : May 31, 2005
INVENTOR(S) : Yoshihiro Terada, Alan Filipski and Marvin T. Ling It is certified that error appears in the above-identified patent and that said Letters Patent is hereby corrected as shown below:

Title page,
Item [73], Assignee, please add -- GTX Corporation, Phoenix, Arizona, USA --.

Signed and Sealed this

Twentieth Day of September, 2005

JON W. DUDAS
*Director of the United States Patent and Trademark Office*